US011235757B2

(12) United States Patent
Tominaga et al.

(10) Patent No.: US 11,235,757 B2
(45) Date of Patent: Feb. 1, 2022

(54) COLLISION AVOIDANCE APPARATUS

(71) Applicant: Mitsubishi Electric Corporation, Tokyo (JP)

(72) Inventors: Kenta Tominaga, Tokyo (JP); Tomoki Uno, Tokyo (JP); Shota Kameoka, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 356 days.

(21) Appl. No.: 16/528,851

(22) Filed: Aug. 1, 2019

(65) Prior Publication Data
US 2020/0070818 A1 Mar. 5, 2020

(30) Foreign Application Priority Data
Sep. 5, 2018 (JP) .............................. JP2018-165655

(51) Int. Cl.
*B60W 30/09* (2012.01)
*B60W 10/02* (2006.01)
(Continued)

(52) U.S. Cl.
CPC ............ *B60W 30/09* (2013.01); *B60W 10/02* (2013.01); *B60W 10/20* (2013.01); *B60W 30/18* (2013.01);
(Continued)

(58) Field of Classification Search
CPC ...... B60W 30/09; B60W 10/02; B60W 10/20; B60W 30/18; B60W 2554/00;
(Continued)

(56) References Cited

U.S. PATENT DOCUMENTS

| 5,408,414 A | * | 4/1995 | Nomoto | ................. G05D 1/106 |
| | | | | 701/518 |
| 9,931,976 B1 | * | 4/2018 | Terwilliger | ............ G08G 1/166 |

(Continued)

FOREIGN PATENT DOCUMENTS

| CN | 108388263 A | * | 8/2018 | |
| EP | 3312820 A1 | * | 4/2018 | ....... G08G 1/096775 |

(Continued)

OTHER PUBLICATIONS

Ji et al., "Vision-based Obstacle Avoidance System for Autonomous Mobile Robot in Outdoor Environment," 2010, Publisher: IEEE.*
(Continued)

*Primary Examiner* — Tuan C To
(74) *Attorney, Agent, or Firm* — Sughrue Mion, PLLC; Richard C. Turner

(57) ABSTRACT

Provided is a collision avoidance apparatus that can avoid a collision through both steering and braking. In a collision avoidance apparatus, a no-entry zone defining unit defines a no-entry zone for preventing a subject vehicle from colliding with an obstacle around the subject vehicle, based on obstacle information including information on a position of the obstacle and based on lane information that is information on a traveling lane of the subject vehicle. A following determination unit determines whether the obstacle is an avoidance target or a following target, based on the position of the obstacle or a position of the no-entry zone. A constraint establishing unit establishes a constraint on a state quantity or a control input of the subject vehicle to prevent the subject vehicle from at least entering the no-entry zone.

15 Claims, 16 Drawing Sheets

(51) Int. Cl.
*B60W 10/20* (2006.01)
*B60W 30/18* (2012.01)
*G08G 1/16* (2006.01)

(52) U.S. Cl.
CPC ......... *G08G 1/166* (2013.01); *B60W 2554/00* (2020.02); *B60W 2554/801* (2020.02); *B60W 2710/20* (2013.01); *B60W 2720/106* (2013.01)

(58) Field of Classification Search
CPC ....... B60W 2554/801; B60W 2710/20; B60W 2720/106; G08G 1/166
USPC .......................................................... 701/50
See application file for complete search history.

(56) References Cited

U.S. PATENT DOCUMENTS

| | | | | |
|---|---|---|---|---|
| 2004/0193349 | A1* | 9/2004 | Flann | A01B 69/008 701/50 |
| 2005/0197766 | A1* | 9/2005 | Flann | G05D 1/0219 701/533 |
| 2010/0235035 | A1 | 9/2010 | Nishira et al. | |
| 2011/0112747 | A1* | 5/2011 | Downs | G08G 1/0969 701/118 |
| 2015/0375743 | A1* | 12/2015 | Izuhara | B60W 30/08 701/36 |
| 2016/0297478 | A1* | 10/2016 | Inoue | B60W 40/08 |
| 2017/0017237 | A1* | 1/2017 | Tokuyama | G05D 1/0246 |
| 2018/0292834 | A1* | 10/2018 | Kindo | B60W 50/14 |
| 2019/0039624 | A1* | 2/2019 | Ike | B60W 30/09 |
| 2019/0084561 | A1 | 3/2019 | Takeda et al. | |
| 2019/0196487 | A1* | 6/2019 | Akiyama | B60W 30/0956 |

FOREIGN PATENT DOCUMENTS

| | | | |
|---|---|---|---|
| JP | 2002063667 | A * | 2/2002 |
| JP | 2007137085 | A * | 6/2007 |
| JP | 2007-253745 | A | 10/2007 |
| JP | 2010-202147 | A | 9/2010 |
| JP | 2012149997 | A * | 8/2012 |
| JP | 2017-114195 | A | 6/2017 |
| WO | 2016/021340 | A1 | 2/2016 |
| WO | 2016/189727 | A1 | 12/2016 |
| WO | 2017/159539 | A1 | 9/2017 |

OTHER PUBLICATIONS

Hongjiu et al., "Nonlinear Control for Tracking and Obstacle Avoidance of a Wheeled Mobile Robot With Nonholonomic Constraint," 2016, vol. 24, Publisher: IEEE.*

V. Sunkara et al., "Collision Avoidance by IPMC Actuated Robotic Fish using the Collision Cone Approach," 2016, Publisher: IEEE.*

Office Action dated Sep. 3, 2019 in Japanese Application No. 2018-165655.

* cited by examiner

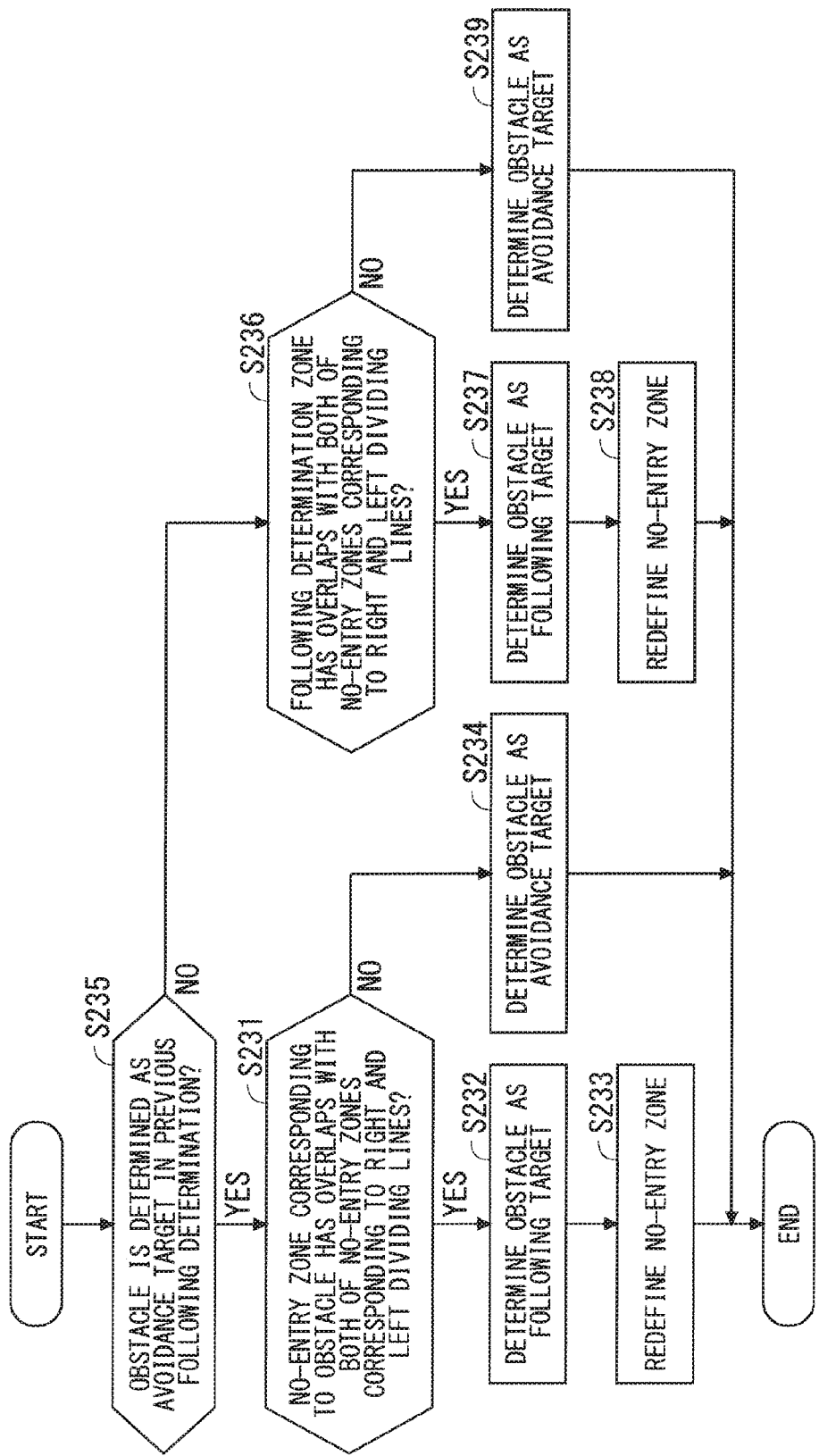

COLLISION AVOIDANCE APPARATUS

BACKGROUND OF THE INVENTION

Field of the Invention

The present invention relates to a collision avoidance apparatus for a vehicle.

Description of the Background Art

Various collision avoidance apparatuses have been proposed which detect an obstacle in a road on which a subject vehicle is traveling and make the subject vehicle avoid the obstacle by automatically steering the subject vehicle. For example, the collision avoidance apparatus disclosed in Japanese Patent Application Laid-Open No. 2007-253745 sets an evaluation function based on a position of an obstacle, a road boundary, a predicted travel path of the subject vehicle, and a predicted attitude angle and a target attitude angle of the subject vehicle after avoiding the obstacle, and controls the subject vehicle so that the subject vehicle will follow the predicted travel path with which the output value of the evaluation function is the smallest to make the subject vehicle avoid the obstacle. This evaluation function is set so that the output value decreases as a distance between the subject vehicle and the obstacle and a distance between the subject vehicle and the road boundary increase and as a difference between the predicted attitude angle and the target attitude angle of the subject vehicle after avoiding the obstacle decreases.

When an obstacle blocks an area where a vehicle can travel, not steering but braking is required to avoid a collision. Since the collision avoidance apparatus disclosed in Japanese Patent Application Laid-Open No. 2007-253745 does not assume a case where an obstacle blocks an area where a vehicle can travel, another vehicle controller needs to control braking in such a case. Thus, controllers that control driving of the vehicle are switched, depending on whether an obstacle blocks an area where a vehicle can travel. Such switching creates concerns about worsening the riding comfort.

SUMMARY

Provided is a collision avoidance apparatus that can avoid a collision through both steering and braking.

The collision avoidance apparatus according to the present invention includes a no-entry zone defining unit, a following determination unit, a constraint establishing unit, an evaluation function setting unit, a solution computing unit, a vehicle state quantity predictor, and a target value computing unit as described below. The no-entry zone defining unit defines a no-entry zone for preventing a subject vehicle from colliding with an obstacle around the subject vehicle, based on obstacle information including information on a position of the obstacle and based on lane information that is information on a traveling lane of the subject vehicle. The following determination unit makes a following determination on whether the obstacle is an avoidance target or a following target, based on the position of the obstacle or a position of the no-entry zone. The constraint establishing unit establishes a constraint on a state quantity or a control input of the subject vehicle to prevent the subject vehicle from at least entering the no-entry zone. The evaluation function setting unit sets an evaluation function for evaluating at least a route following error and a speed following error as evaluation items so that a degree of evaluation increases as the route following error is smaller and the speed following error is smaller, the route following error being an error in a predicted route with respect to a target route of the subject vehicle, the speed following error being an error in a predicted p d with respect to a target speed of the subject vehicle. The solution computing unit computes, under the constraint, a solution for increasing the degree of evaluation on the evaluation function. The vehicle state quantity predictor computes a predicted value of the state quantity of the subject vehicle based on the solution. The target value computing unit computes a target value of each of an actuator that controls an amount of steering of the subject vehicle and an actuator that controls an amount of acceleration or deceleration of the subject vehicle, based on at least one of the solution and the predicted value of the state quantity.

Since the same collision avoidance apparatus can avoid a collision through both steering and braking according to the present invention, it is possible to prevent worsening of the riding comfort caused by switching between the steering and the braking for avoiding a collision.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a flowchart for a process for making a following determination according to Embodiment 2 of the present invention.

DESCRIPTION OF THE PREFERRED EMBODIMENTS

Embodiment 1

Figure 1:
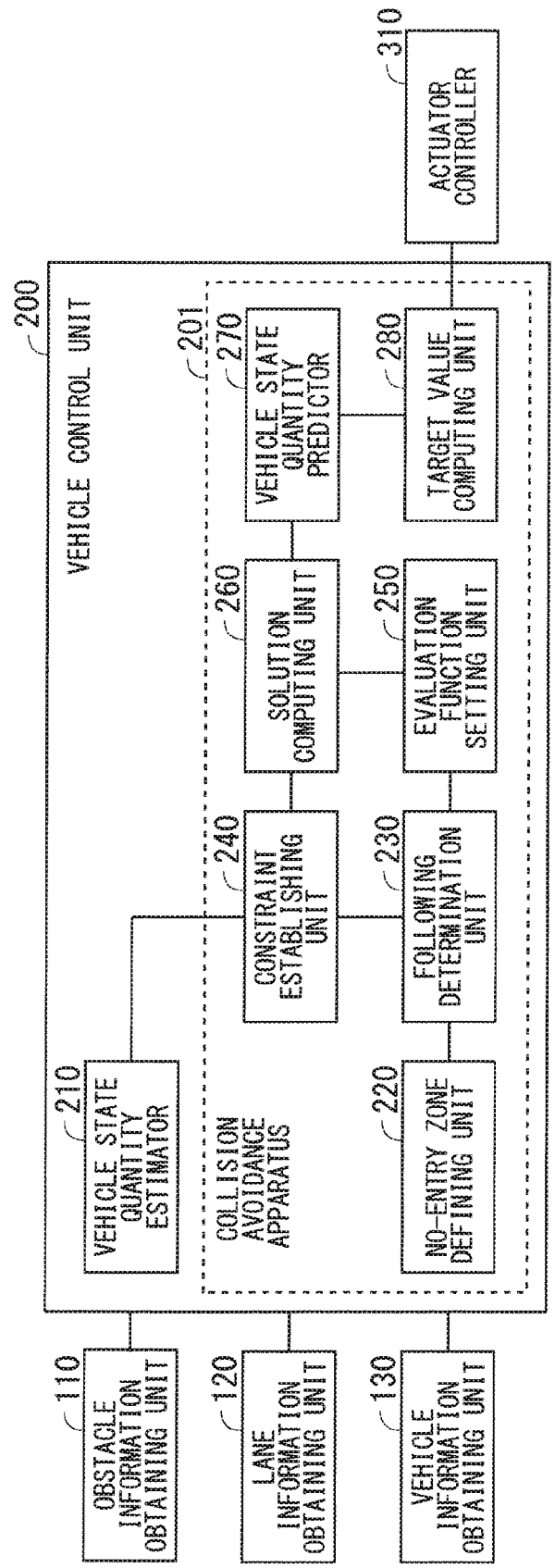
FIG. 1 is a block diagram illustrating a configuration of a collision avoidance system according to Embodiment 1 of the present invention.

FIG. 1 is a block diagram illustrating a schematic configuration of a collision avoidance system according to Embodiment 1 of the present invention. The collision avoidance system is mounted on a vehicle, and includes a vehicle control unit 200, and an obstacle information obtaining unit 110, a lane information obtaining unit 120, a vehicle information obtaining unit 130, and an actuator controller 310 each of which is connected to the vehicle control unit 200.

The vehicle control unit 200 controls the overall operations of a vehicle on which the collision avoidance system is mounted (hereinafter referred to as a "subject vehicle"). The vehicle control unit 200 is, for example, an advanced driver-assistance systems Electronic Control Unit (ADAS-ECU).

The obstacle information obtaining unit 110 obtains obstacle information including information on a position of an obstacle around the subject vehicle. The obstacle information obtaining unit 110 is, for example, a forward camera that captures a landscape image ahead of the subject vehicle. Alternatively, the obstacle information obtaining unit 110 may be, for example, a light detection and ranging (LiDAR), a radar, a sonar, an inter-vehicle communication device, or a roadside-to-vehicle communication device.

The lane information obtaining unit 120 obtains lane information that is information on a traveling lane of the subject vehicle. The lane information includes information on positions of left and right dividing lines of a traveling lane of the subject vehicle and on positions of the center of the lane. The lane information obtaining unit 120 is, for example, a forward camera. Alternatively, the lane information obtaining unit 120 may obtain the lane information from a result of detecting the lane by the LiDAR and map data, or from a position of the subject vehicle measured by a global navigation satellite system (GNSS) sensor and map data.

The vehicle information obtaining unit 130 obtains vehicle information such as a speed, an acceleration, an orientation, and an angular velocity of the subject vehicle. The vehicle information obtaining unit 130 is, for example, a steering angle sensor, a steering torque sensor, a yaw rate sensor, a speed sensor, or an acceleration sensor.

The actuator controller 310 controls an actuator of the subject vehicle so that the actuator attains a target value. The actuator controller 310 is, for example, an electric power steering ECU (EPS-ECU), a powertrain ECU, or a brake ECU.

As illustrated in FIG. 1, the vehicle control unit 200 includes a collision avoidance apparatus 201 and a vehicle state quantity estimator 210. Further, the collision avoidance apparatus 201 includes a no-entry zone defining unit 220, a following determination unit 230, a constraint establishing unit 240, an evaluation function setting unit 250, a solution computing unit 260, a vehicle state quantity predictor 270, and a target value computing unit 280.

The vehicle state quantity estimator 210 estimates a vehicle state of the subject vehicle, based on the vehicle information obtained by the vehicle information obtaining unit 130. The no-entry zone defining unit 220 predicts movement of an obstacle around the subject vehicle, based on the obstacle information obtained by the obstacle information obtaining unit 110, and defines a no-entry zone for preventing the subject vehicle from colliding with the obstacle, based on the predicted movement of the obstacle and the lane information obtained by the lane information obtaining unit 120. Before defining a no-entry zone, the no-entry zone defining unit 220 determines whether to steer right or left around an obstacle, that is, whether the subject vehicle passes to the right or the left of an obstacle when the subject vehicle avoids the obstacle. Then, the no-entry zone defining unit 220 defines the no-entry zone based on a result of the determination.

The following determination unit 230 determines whether the obstacle is an avoidance target or a following target (hereinafter referred to as a "following determination"), based on a position of the obstacle or a position of the no-entry zone. The constraint establishing unit 240 establishes a constraint on a state quantity or a control input of the subject vehicle when the subject vehicle avoids the obstacle, based on a result of the following determination made by the following determination unit 230, the predicted movement of the obstacle obtained by the no-entry zone defining unit 220, and the lane information obtained by the lane information obtaining unit 120.

The evaluation function setting unit 250 sets an evaluation function for evaluating at least a route following error that is an error in a predicted route with respect to a target route of the subject vehicle and a speed following error that is an error in a predicted speed with respect to a target speed of the subject vehicle. The solution computing unit 260 computes, under the constraint established by the constraint establishing unit 240, a solution for reducing the evaluation function, that is, a predicted value of the control input. The vehicle state quantity predictor 270 computes a predicted value of a vehicle state quantity of the subject vehicle, based on the predicted value of the control input computed by the solution computing unit 260.

The target value computing unit 280 computes a target value of an actuator from the predicted value of the vehicle state quantity computed by the vehicle state quantity predictor 270 and the predicted value of the control input computed by the solution computing unit 260. Upon receipt of the target value of the actuator computed by the target value computing unit 280, the actuator controller 310 controls the actuator so that the actuator attains the target value.

Figure 2:
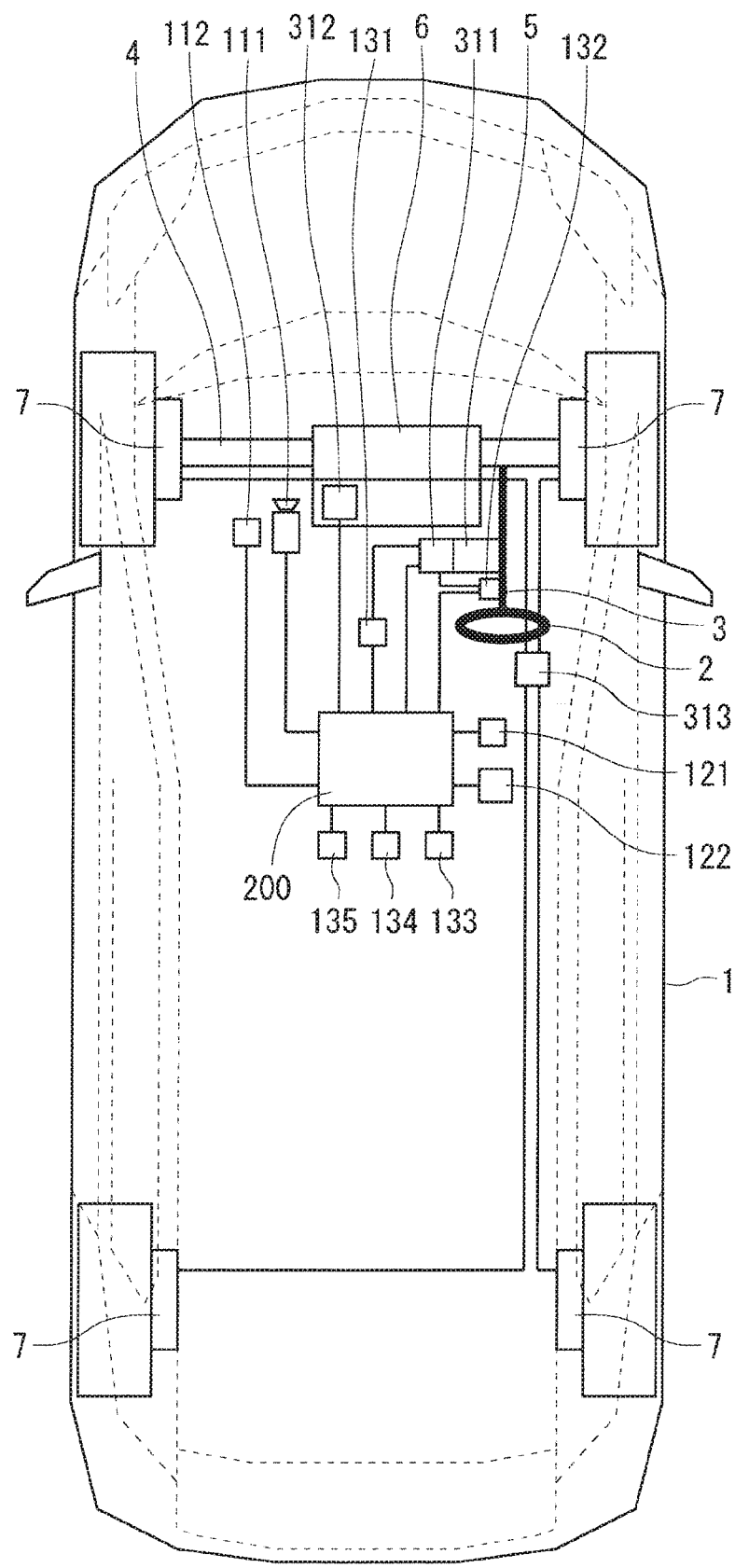
FIG. 2 illustrates an example hardware configuration of the collision avoidance system according to Embodiment 1 of the present invention.

FIG. 2 illustrates an example hardware configuration of the collision avoidance system. A subject vehicle 1 on which the collision avoidance system is to be mounted includes a steering wheel 2, a steering axle 3, a steering unit 4, an EPS motor 5, a powertrain unit 6, brake units 7, a forward camera 111, a radar sensor 112, a GNSS sensor 121, a navigation device 122, a steering angle sensor 131, a steering torque sensor 132, a yaw rate sensor 133, a speed sensor 134, an acceleration sensor 135, the vehicle control unit 200 illustrated in FIG. 1, an EPS controller 311, a powertrain controller 312, and a brake controller 313.

The steering wheel 2 is also called a hand wheel for the driver to operate the subject vehicle 1. The steering wheel 2 is joined to the steering axle 3 communicating to the steering unit 4. The steering unit 4 rotatably supports the front wheels as the steering tires, and is supported by a car frame so that the steering unit 4 can be steered. Thus, a steering torque generated by the driver through operating the steering wheel 2 causes the steering axle 3 to rotate. The steering unit 4 horizontally steers the front wheels according to the rotation of the steering axle 3. Consequently, the driver can manipulate an amount of lateral movement of the subject vehicle 1 in moving forward or backward.

The steering axle 3 may be rotated by the EPS motor 5. The EPS controller 311 controls the current that flows through the EPS motor 5, so that the front wheels can be steered independent of the operation of the steering wheel 2 by the driver.

The vehicle control unit 200 is connected to the forward camera 111, the radar sensor 112, the GNSS sensor 121, the navigation device 122, the steering angle sensor 131, the steering torque sensor 132, the yaw rate sensor 133, the speed sensor 134, the acceleration sensor 135, the EPS controller 311, the powertrain controller 312, and the brake controller 313.

The forward camera 111 is disposed in a position where the dividing lines ahead of the vehicle can be detected as an image, and detects a forward environment of the subject vehicle such as the lane information or a position of an obstacle, based on the image information. Although FIG. 2 illustrates only the forward camera that detects the forward environment, the subject vehicle 1 may include a camera that detects a rear or lateral environment. The radar sensor 112 irradiates an obstacle with radar beam, and detects the reflected wave to output a relative distance and a relative speed of the obstacle with respect to the subject vehicle 1. The radar sensor 112 may be a known device such as a millimeter wave radar, a LiDAR, a laser range finder, or a ultrasonic radar. The obstacle information obtaining unit 110 illustrated in FIG. 1 includes the forward camera 111 and the radar sensor 112.

The GNSS sensor 121 receives radio waves from a positioning satellite via an antenna, and outputs an absolute position and an absolute orientation of the subject vehicle 1 through positioning computation. The navigation device 122 has a function of computing the optimal traveling route to a destination set by the driver, and stores map data including road information on roads for constructing a road network. The road information is map node data for representing road alignments. Each map node data includes information on, for example, an absolute position (a latitude, a longitude, an altitude) of a node, a lane width, an angle of cant, and an angle of dip. The lane information obtaining unit 120 illustrated in FIG. 1 includes the GNSS sensor 121 and the navigation device 122.

The steering angle sensor 131 detects a steering angle of the steering wheel 2. The steering torque sensor 132 detects a steering torque of the steering axle 3. The yaw rate sensor 133 detects a yaw rate of the subject vehicle 1. The speed sensor 134 detects a speed of the subject vehicle 1. The acceleration sensor 135 detects an acceleration of the subject vehicle 1. The vehicle information obtaining unit 130 illustrated in FIG. 1 includes the steering angle sensor 131, the steering torque sensor 132, the yaw rate sensor 133, the speed sensor 134, and the acceleration sensor 135.

The vehicle control unit 200 is an integrated circuit such as a microprocessor, and includes an A/D conversion circuit, a D/A conversion circuit, a processor such as a central processing unit (CPU), and a memory such as a read only memory (ROM) and a random access memory (RAM). The processor of the vehicle control unit 200 processes information received from each of the sensors, according to a program stored in the ROM to compute a target steering angle, a target driving force, and a target braking force of the subject vehicle 1.

In other words, the vehicle control unit 200 includes a memory to store a program which, when executed by a processor, consequently performs processes on defining a no-entry zone for preventing a subject vehicle from colliding with an obstacle around the subject vehicle, based on obstacle information including information on a position of the obstacle and based on lane information that is information on a traveling lane of the subject vehicle; making a following determination on whether the obstacle is an avoidance target or a following target, based on the position of the obstacle or a position of the no-entry zone; establishing a constraint on a state quantity or a control input of the subject vehicle to prevent the subject vehicle from at least entering the no-entry zone; setting an evaluation function for evaluating at least a route following error and a speed following error as evaluation items so that a degree of evaluation increases as the route following error is smaller and the speed following error is smaller, the route following error being an error in a predicted route with respect to a target route of the subject vehicle, the speed following error being an error in a predicted speed with respect to a target speed of the subject vehicle; computing, under the constraint, a solution for increasing the degree of evaluation on the evaluation function; computing a predicted value of the state quantity of the subject vehicle based on the solution; and computing a target value of each of an actuator that controls an amount of steering of the subject vehicle and an actuator that controls an amount of acceleration or deceleration of the subject vehicle, based on at least one of the solution and the predicted value of the state quantity. Put it differently, this program causes a computer to execute procedures or methods of operations of the constituent elements of the collision avoidance apparatus 201.

The vehicle control unit 200 transmits the target steering angle to the EPS controller 311, transmits the target driving force to the powertrain controller 312, and transmits the target braking force to the brake controller 313.

The EPS controller 311 controls the EPS motor 5 so that the EPS motor 5 attains the target steering angle received from the vehicle control unit 200. The powertrain controller 312 controls the powertrain unit 6 so that the powertrain unit 6 attains the target driving three received from the vehicle control unit 200. The brake controller 313 controls the brake unit 7 so that the brake unit 7 attains the target braking force received from the vehicle control unit 200. The actuator controller 310 illustrated in FIG. 1 includes the EPS controller 311, the powertrain controller 312, and the brake controller 313.

Although FIG. 2 illustrates, as the example of the subject vehicle 1, a vehicle that applies only an engine as the driving power source, the subject vehicle 1 may be an electrical car that applies only an electric motor as the driving power source, or a hybrid car that applies both the engine and the electric motor as the driving power source.

Figure 3:
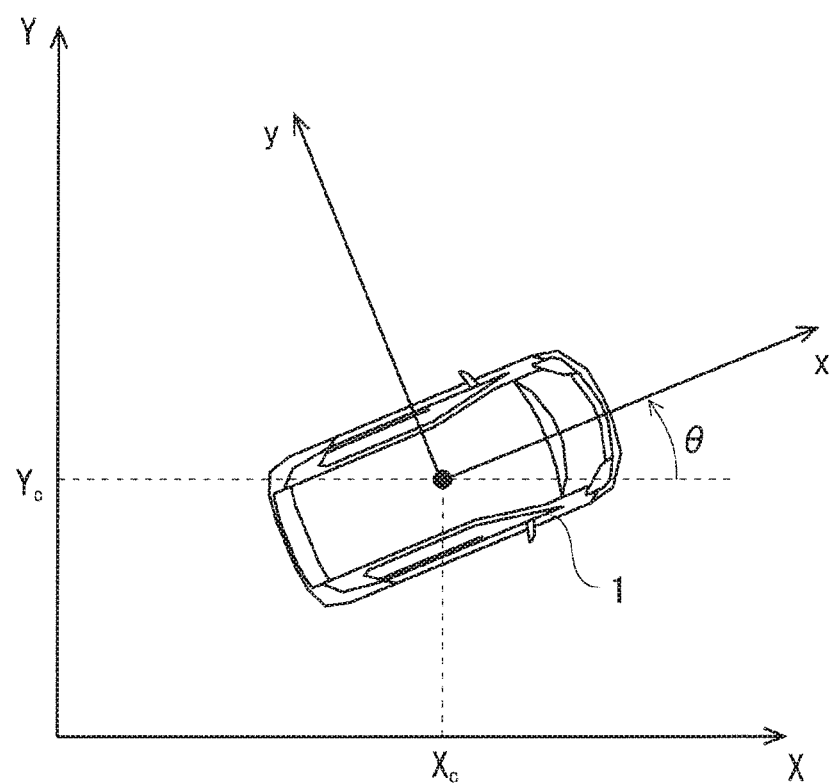
FIG. 3 illustrates a coordinate system to be applied in Embodiment 1 of the present invention.

Next, operations of the collision avoidance system according to Embodiment 1 will be described. FIG. 3 schematically illustrates a coordinate system to be applied to the collision avoidance system according to Embodiment 1. In FIG. 3, X- and Y-axes represent the inertial coordinate system, and $X_c$, $Y_c$, and $\theta$ represent a center-of-gravity position and an azimuth angle of the subject vehicle 1 in the inertial coordinate system x- and y-axes represent the subject-vehicle coordinate system with respect to the center of gravity of the subject vehicle 1 as the origin. The x-axis is equal to a direction in which the subject vehicle 1 proceeds, and the y-axis is perpendicular to the x-axis to the left. In Embodiment 1, the center-of-gravity position $X_c$, $Y_c$, and the azimuth angle $\theta$ of the subject vehicle 1 are reset to 0 every control period. In other words, the inertial coordinate system is made to coincide with the subject-vehicle coordinate system every control period. When change in the azimuth angle θ is smaller, this process enables one to regard the X direction as a forward direction of the subject vehicle 1 and the Y direction as a lateral direction of the subject vehicle 1.

The solution computing unit 260 of the collision avoidance apparatus 201 predicts a behavior of the subject vehicle 1 from the current time 0 to a future time point after a lapse of a time $T_h$ at regular intervals $T_S$ using a dynamic vehicle model mathematically representing dynamics of vehicles. Then, the solution computing unit 260 solves, at regular intervals, an optimization problem for finding a control input u for minimizing an evaluation function that represents a desired operation of the subject vehicle 1 to compute, as the solution, the optimal target amount of steering, or the optimal target amount of steering and the optimal target acceleration. Here, the number of the vehicle state quantities to be predicted is N ($N=T_h/T_s$). The time from the current time to the future time point after a lapse of the time $T_h$ will be referred to as a "horizon".

Predicting a behavior of the subject vehicle 1 in the future and predetermining whether an obstacle is an avoidance target or a following target ensures leeway until the collision is avoided. This can reduce a possibility of sudden steering or sudden braking, which will improve the riding comfort of the subject vehicle 1. Moreover, reduction in the possibility of sudden steering or sudden braking produces advantages of reducing the computation load and increasing a probability of finding the optimal solution.

The collision avoidance apparatus 201 does not perform a state transition to an avoidance mode or a following mode according to an obstacle, but determines whether each obstacle is an avoidance target or a following target, which will be described later. In the presence of a plurality of obstacles, the collision avoidance apparatus 201 can select whether to avoid or follow each of the obstacles. For example, the collision avoidance apparatus 201 can control the subject vehicle 1 by steering around another vehicle that is stopped at a road shoulder, while making the subject vehicle 1 follow a preceding vehicle.

The solution for the optimization problem may not be the one that always minimize the evaluation function but may be any as long as the degree of evaluation increases as the evaluation function is smaller. For example, an input value that can make the evaluation function smaller than a predefined threshold may be the solution. When the evaluation function does not fall below the threshold even by performing repeated calculation a predefined number of times, an input value that can minimize the evaluation function among input values applied in the repeated calculations may be the solution.

Although the optimization problem is handled as a minimization problem according to Embodiment 1, the optimization problem may be handled as a maximization problem by reversing the sign of the evaluation function. In such a case, the solution for the optimization problem does not always have to maximize the evaluation function. For example, an input value that can make the evaluation function larger than the predefined threshold may be the solution. When the evaluation function does not exceed the threshold even by performing repeated calculation a predefined number of times, an input value that can maximize the evaluation function among input values applied in the repeated calculations may be the solution.

Examples of the optimization problem to be solved by the solution computing unit 260 will be described. In the following description, the symbol "_" will mean an underscore attached to a subsequent character, the symbol "-" will mean an overline attached to a subsequent character, and the symbol "^" will mean a hat (caret) attached to a subsequent character.

According to Embodiment 1, the solution computing unit 260 solves the optimization problems with constraints as indicated below at regular intervals.

$$\min_u J \quad \text{(Equation 101)}$$

$$s.t. \dot{x}=f(x,u)$$

$$x_0=x(0)$$

$$g(x,u)\leq 0 \quad \text{(Equation 102)}$$

Here, J denotes an evaluation function, x denotes a vehicle state quantity, u denotes a control input, f denotes a vector-valued function on a dynamic vehicle model, $x_0$ denotes an initial value, and g denotes a vector-valued function on constraints.

According to Embodiment 1, the vehicle control unit 200 performs both steering control and acceleration and deceleration control, and the vehicle state quantity x and the control input u will be set as follows.

$$x=[X_c, Y_c, \theta, \beta, \gamma, \delta, V, \alpha]^T \quad \text{(Equation 103)}$$

$$u=[\omega, j]^T \quad \text{(Equation 104)}$$

Here, β denotes an angle of sideslip, γ denotes a yaw rate, δ denotes a steering angle, V denotes a speed, a denotes an acceleration, ω denotes a steering angle velocity, and j denotes a jerk. There is no need to make the control input u coincide with a controlled variable of the actuator controller 310. Thus, the vehicle state quantity x and the control input u can be set independent of the controlled variable of the actuator controller 310. Substituting the steering angle velocity for the steering angle as the control input, the magnitude of variations in the steering angle can be easily limited depending on the evaluation function or settings of the constraints. Thus, the riding comfort of the vehicle be improved. Similarly, substituting the jerk for the acceleration as the control input, the magnitude of variations in acceleration can be easily limited depending on the evaluation function or the settings of the constraints. Thus, the riding comfort of the vehicle will be improved.

The following two-wheel model will be used as the dynamic vehicle model.

$$\dot{x} = f(x, u) = \begin{bmatrix} V\cos(\theta+\beta) \\ V\sin(\theta+\beta) \\ \gamma \\ -\gamma + \frac{2}{MV}(Y_f + Y_r) \\ -\gamma + \frac{2}{MV}(Y_f + Y_r) \\ \omega \\ \alpha \\ j \end{bmatrix} \quad \text{(Equation 105)}$$

Here, M denotes a mass of the vehicle. $Y_f$ and $Y_r$ denote cornering forces of the front wheel and the rear wheel, and can be approximated using the cornering stiffnesses $C_f$ and $C_r$ of the front wheel and the rear wheel, respectively. Here, $l_f$ and $l_r$ denote distances from the center of gravity of the vehicle to the front axle and the rear axle, respectively.

$$Y_f = -C_f\left(\beta + \frac{l_f}{V}\gamma - \delta\right) \quad \text{(Equation 106)}$$

$$Y_r = -C_r\left(\beta - \frac{l_r}{V}\gamma\right) \quad \text{(Equation 107)}$$

Rearranging Equation 105 using Equations 106 and 107, the following Equation is obtained as the dynamic vehicle model f.

$$\dot{x} = f(x, u) = \begin{bmatrix} V\cos(\theta + \beta) \\ V\sin(\theta + \beta) \\ \gamma \\ -\left(1 + \frac{2(C_f l_f - C_r l_r)}{MV^2}\right)\gamma - \frac{2}{MV}(C_f + C_r)\beta + \frac{2C_f}{MV}\delta \\ -\frac{2}{IV}(C_f l_f^2 + C_r l_r^2)\gamma - \frac{2}{I}(C_f l_f - C_r l_r)\beta + \frac{2}{I}C_f l_f \delta \\ \omega \\ \alpha \\ j \end{bmatrix} \quad \text{(Equation 108)}$$

The dynamic vehicle model may be other than the two-wheel model if the vehicle state quantity includes the position of the vehicle. $x=[X_c, Y_c, \theta, \beta, \gamma, V]^T$ and $u=[\delta, \alpha]^T$ may hold to simplify the model.

The following Equation will be used for the evaluation function J according to Embodiment 1.

$$J = (h_N(x_N) - r_N)^T W_N (h_N(x_N) - r_N) + \sum_{k=0}^{N-1} (h(x_k, u_k) - r_k)^T W (h(x_k, u_k) - r_k) \quad \text{(Equation 109)}$$

Here, $x_k$ denotes a vehicle state quantity at a predicted point k (k=0, . . . , N), whereas $u_k$ denotes a control input at the predicted point k (k=0, . . . , N−1). h denotes a vector-valued function on an evaluation item, $h_N$ denotes a vector-valued function on the evaluation item at the end (a predicted point N), and $r_k$ denotes a target value at the predicted point k (k=0, . . . , N). Each of W and $W_N$ denotes a weighted matrix that is a diagonal matrix having weights to the respective evaluation items as diagonal components, and can be appropriately changed as a parameter. The weighted matrices W and $W_N$ may be changed, depending on whether an obstacle is an avoidance target or a following target. For example, when an obstacle is an avoidance target, reduction in a weight assigned to a route following error enables the subject vehicle to smoothly avoid a collision through steering. For example, when an obstacle is a following target, reduction in a weight assigned to a speed following error enables the subject vehicle to smoothly avoid a collision through braking.

According to Embodiment 1, the steering control and the acceleration and deceleration control are performed so that the vehicle travels along a target route at a target speed with a small control input. The vector-valued functions h and $h_N$ on an evaluation item will be set as follows.

$$h = [e_{Y,k}, e_{V,k}, \omega_k, j_k]^T \quad \text{(Equation 110)}$$

$$h_N = [e_{Y,N}, e_{V,N}]^T \quad \text{(Equation 111)}$$

Here, $e_{Y,k}$ denotes a route following error at the predicted point k (k=0, . . . , N) that is an error in a predicted route with respect to a target route of the subject vehicle. If the target route is represented by a function y=l(x) in the subject-vehicle coordinate system, the route following error $e_{Y,k} = Y_{c,k} - l(X_{c,k})$ holds. The target route may be any route represented by a function, for example, a route obtained by functional approximation of the center of the lane to be generated by the lane information obtaining unit 120. $e_{V,k}$ denotes a speed following error that is an error in a predicted speed with respect to a target speed of the subject vehicle at the predicted point k (k=0, . . . , N). Assuming the target speed as $V_{ref}$, the speed following error $e_{V,k} = V_k - V_{ref}$ holds. The target speed $V_{ref}$ is, for example, a speed limit of a traveling lane of the subject vehicle, and is obtained by the lane information obtaining unit 120.

Then, the target values $r_k$ and $r_N$ will be set as follows so that the route following error $e_{Y,k}$, the speed following error $e_{V,k}$, the steering speed $\omega_k$, and the jerk $j_k$ are reduced.

$$r_k = [0,0,0,0]^T (k=0, \ldots, N-1) \quad \text{(Equation 112)}$$

$$r_N = [0,0]^T \quad \text{(Equation 113)}$$

Without any avoidance target in a horizon, evaluation of the route following error allows the subject vehicle to keep the lane. If there is an avoidance target in the horizon, setting a no-entry zone including the position of the avoidance target allows the subject vehicle to avoid a collision through steering. Without any following target in a horizon, evaluation of the speed following error allows the subject vehicle to keep the speed. If there is a following target in the horizon, setting a no-entry zone or an upper speed limit allows the subject vehicle to avoid a collision through braking. Thus, the same controller can keep a lane and a speed and avoid a collision through steering and braking, and can smoothly avoid a collision irrespective of whether an obstacle blocks an area where the subject vehicle can travel.

Although the evaluation items are set to evaluate only a route following error, a speed following error, a steering speed, and a jerk according to Embodiment 1, for example, an orientation, a yaw rate, and an acceleration may be added to the evaluation items to improve the route following performance and the riding comfort. The evaluation items may be changed, depending on whether an obstacle is an avoidance target or a following target. For example, when an obstacle is an avoidance target, evaluation of a yaw rate and a lateral acceleration allows the subject vehicle to smoothly avoid a collision through steering. For example, when an obstacle is a following target, evaluation of a longitudinal acceleration allows the subject vehicle to smoothly avoid a collision through braking.

Next, the vector-valued function g on constraints will be described. The function g is to set upper limit values and lower limit values (may be referred to as "upper and lower limit values") of the vehicle state quantity x and the control input u in the optimization problem with constraints. The optimization will be performed under a condition of g(x, u)≤0.

Assuming an upper limit value of the center-of-gravity position $X_C$ of a vehicle as $^-X_C(\geq 0)$, an upper limit value of the center-of-gravity position $Y_c$ of the vehicle as $^-Y_c(>0)$ and a lower limit value thereof as $\_Y_c$ (<0), an upper limit value of the speed V as $^-V$ ($\geq 0$), an upper limit value of the steering speed ω as $^-\omega(>0)$ and a lower limit value thereof as $\_\omega(<0)$, and an upper limit value of the jerk j as $^-j$ (>0) and a lower limit value thereof as $\_j$ (<0), the function g will be set as follows to define a no-entry zone and avoid a collision at a steering speed and with a jerk that are in a certain range through steering or braking according to Embodiment 1.

$$g = \begin{bmatrix} X_c - \overline{X}_c \\ Y_c - \overline{Y}_c \\ -Y_c + \underline{Y}_c \\ V - \overline{V} \\ \omega - \overline{\omega} \\ -\omega + \underline{\omega} \\ j - \overline{j} \\ -j + \underline{j} \end{bmatrix}$$

(Equation 114)

When change in the azimuth angle θ is smaller in the horizon, the x direction can be considered as a longitudinal direction (a forward direction) of the vehicle. Thus, setting the upper limit value of $X_C$ can establish a constraint on a longitudinal position of the vehicle, which enables the subject vehicle to avoid a collision through braking. Further, the Y direction can be considered as a lateral direction of the vehicle. Thus, setting the upper and lower limit values of $Y_c$ can establish a constraint on a lateral position of the vehicle, which enables the subject vehicle to avoid a collision through steering. Further, setting the upper limit value of the speed V can control a speed relative to a speed of a following target, which enables the subject vehicle to avoid a collision through braking. One of the upper limit value of the center-of-gravity position $X_C$ and the upper limit value of the speed V of the vehicle may be set. Moreover, setting the upper and lower limit values of the steering speed ω and the jerk j allows the vehicle control while the riding comfort is maintained.

A constraint on a command value for an actuator may be established. The constraint on the command value for the actuator may be changed, depending on whether an obstacle is an avoidance target or a following target. For example, when an obstacle is an avoidance target, easing a constraint on a command value for an actuator that controls an amount of steering of the vehicle can reduce a possibility of failing to avoid a collision due to a shortage of the amount of steering caused by braking. Furthermore, when an obstacle is a following target, easing a constraint on a command value for an actuator that controls an amount of acceleration or deceleration of the vehicle can reduce a possibility of failing to avoid a collision due to a shortage of an amount of braking caused by the constraint.

Figure 4:
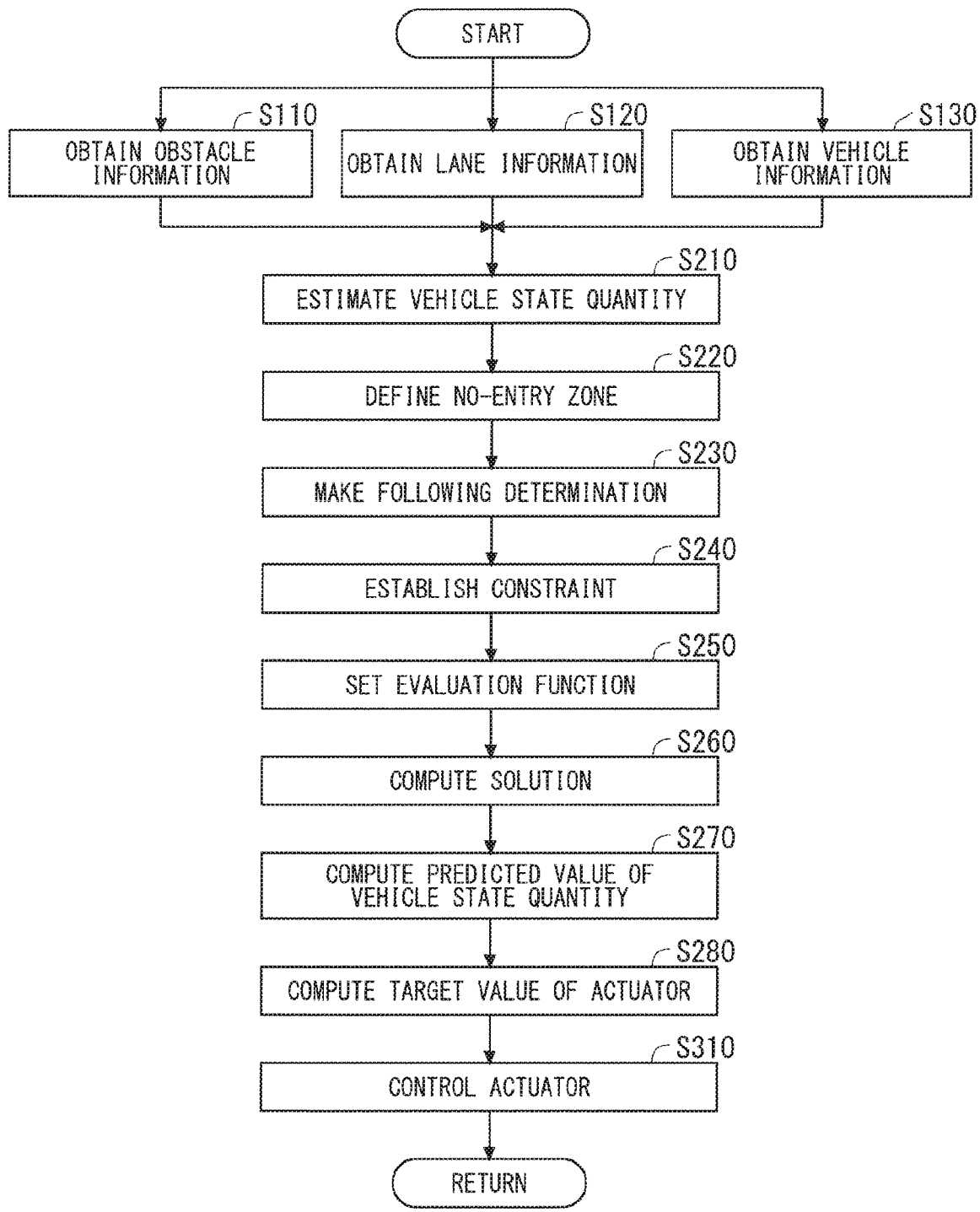
FIG. 4 is a flowchart indicating operations of the collision avoidance system according to Embodiment 1 of the present invention.

FIG. 4 is a flowchart indicating operations of the collision avoidance system according to Embodiment 1. The operations of the collision avoidance apparatus 201 will be described with reference to FIG. 4.

Upon start of the collision avoidance apparatus 201, the following steps S110, S120, and S130 will be performed. In Step S110, the obstacle information obtaining unit 110 obtains the obstacle information including information on a position of an obstacle. When an obstacle is ahead on the left of the subject vehicle 1, positions of the right front end $P_{FR}$, the right rear end $P_{RR}$, and the left rear end $P_{RL}$ of the obstacle in the subject-vehicle coordinate system are obtained as the obstacle information according to Embodiment 1. When an obstacle is ahead on the right of the subject vehicle 1, positions of the left front end $P_{FL}$, the left rear end $P_{RL}$, and the right rear end $P_{RR}$ of the obstacle in the subject-vehicle coordinate system are obtained as the obstacle information according to Embodiment 1. Moreover, the obstacle information obtaining unit 110 estimates, based on these obtained pieces of position information, the position of the left front end $P_{FL}$ or the right front end $P_{FR}$ of the obstacle, the position $x_{obs}$, $y_{obs}$ of the center $O_{obs}$, the azimuth angle $\theta_{obs}$, the speed $V_{obs}$, the length $l_{obs}$, and the width $w_{obs}$ of the obstacle.

In Step S120, the lane information obtaining unit 120 obtains the lane information including information on positions of left and right dividing lines of a lane in which the subject vehicle should travel and on positions of the center of the lane. According to Embodiment 1, coefficients when the left and right dividing lines are represented by cubic polynomials in the subject-vehicle coordinate system are obtained as the lane information. In other words, the values $C_{l0}$ to $C_{l3}$ in the following Equation are obtained for the left dividing line.

$$y = C_{l3}x^3 + C_{l2}x^2 + C_{l1}x + C_{l0}$$

(Equation 115)

Furthermore, the values $C_{r0}$ to $C_{r3}$ in the following Equation are obtained for the right dividing line.

$$y = C_{r3}x^3 + C_{r2}x^2 + C_{r1}x + C_{r0}$$

(Equation 116)

Here, the center of the lane (target route) will be represented by the following Equations.

$$y = l(x) = C_{c3}x^3 + C_{c2}x^2 + C_{c1}x + C_{c0}$$

(Equation 117)

$$C_{ci} = \frac{(C_{li} + C_{ri})}{2} (i = 0, \dots, 3)$$

(Equation 118)

Information on the dividing lines may be represented by any function, not limited to the cubic polynomials. The target route may not be the center of the lane but any route represented by a function.

In Step S130, the vehicle information obtaining unit 130 obtains the vehicle information such as a steering angle, a yaw rate, a speed, and an acceleration of the subject vehicle.

According to Embodiment 1, the steering angle δ, the yaw rate γ, the speed V, and the acceleration "a" are obtained as the vehicle information.

Next in Step S210, the vehicle state quantity estimator 210 estimates a vehicle state quantity x of the subject vehicle. Known technologies such as a low-pass filter, an observer, a Kalman filter, and a particle filter are applicable for estimating the vehicle state quantity.

In Step S220, the no-entry zone defining unit 220 predicts movement of an obstacle, and defines a no-entry zone based on the predicted movement of the obstacle. Specifically, the no-entry zone defining unit 220 predicts the center position coordinates $x_{obs,k}$ and $y_{obs,k}$ of the obstacle at each predicted point k (k=1, ..., N). According to Embodiment 1, the motion of the obstacle is approximated by a linear uniform motion. Then, the no-entry zone defining unit 220 predicts the center position coordinates $X_{obs,k}$ and $y_{obs,k}$ are predicted from the next Equations, using the center position coordinates $x_{obs,0}$ and $y_{obs,0}$, the azimuth angle $\theta_{obs}$, and the speed $V_{obs}$ of the obstacle at the current time that are obtained by the obstacle information obtaining unit 110.

$$x_{obs,k} = x_{obs,0} + V_{obs} \cos(\theta_{obs}) \cdot T_s \cdot k \quad \text{(Equation 119)}$$

$$y_{obs,k} = y_{obs,0} + V_{obs} \sin(\theta_{obs}) \cdot T_s \cdot k \quad \text{(Equation 120)}$$

In the presence of a plurality of obstacles, the no-entry zone defining unit 220 predicts the center position coordinates $x_{obs,k}$ and $y_{obs,k}$ of each of the obstacles. The no-entry zone defining unit 220 may predict the movement, not using the approximation of the linear uniform motion but using a vehicle model such as the two-wheel model.

Next in Step S230, the following determination unit 230 makes a following determination on whether an obstacle is an avoidance target or a following target.

Next in Step S240, the constraint establishing unit 240 generates a constraint (Equation 114). Further in Step S250, the evaluation function setting unit 250 generates an evaluation function (Equation 109).

In Step S260, the solution computing unit 260 computes a solution of the optimization problem with a constraint, using the evaluation function (Equation 109) and the constraint (Equation 114). Known means such as Automatic Control and Dynamic Optimization (ACADO) developed by KU Leuven University and AutoGen that is an automated code generation tool that solves the optimization problem based on the Continuation/Generalized Minimum Residual (C/GMRES) method are applicable for computing the solution.

Next in Step S270, the vehicle state quantity predictor 270 computes a predicted value of the vehicle state quantity of the subject vehicle. When ACADO or AutoGen is applied in Step S260, a time series of control inputs (an optimal control input) u* optimized at each predicted point k (k=1, ..., N−1) is equal to output of the solution computing unit 260. In other words, the output of the solution computing unit 260 is represented by the next Equation.

$$u^* = [u_0^{*T} \ldots u_{N-1}^{*T}]^T \quad \text{(Equation 121)}$$

Here, in the prediction of the vehicle state quantity in Step S270, the vehicle state quantity predictor 270 computes an optimized time series of vehicle state quantities (an optimal state quantity) x*, using u* and the dynamic vehicle model f. Here, x* is represented by the next Equation.

$$x^* = [x_0^{*T} \ldots x_N^{*T}]^T \quad \text{(Equation 122)}$$

Next in Step S280, the target value computing unit 280 computes a target value of an actuator. Since the vehicle control unit 200 performs the steering control and the acceleration and deceleration control according to Embodiment 1, the target value computing unit 280 transmits the target steering angle $\delta_{ref}$ and the target acceleration $\alpha_{ref}$ that are represented by the following Equations to the actuator controller 310.

$$\delta_{ref} = x_1^*[6] = \delta_1^* \quad \text{(Equation 123)}$$

$$\alpha_{ref} = x_1^*[8] = \alpha_1^* \quad \text{(Equation 124)}$$

Here, $x_k^*[i]$ denotes the i-th element of the optimal state quantity $x_k^*$ at the predicted point k. When the target value computing unit 280 transmits another target value to the actuator controller 310, the target value may be computed from the optimal state quantity x* or the optimal control input u*. When the target value computing unit 280 transmits, for example, a target steering speed $\omega_{ref}$ to the actuator controller 310, $\omega_{ref} = u_0^*[1] = \omega_0^*$ may hold.

Next in Step S310, the actuator controller 310 controls the actuator so that the actuator attains the target value received from the target value computing unit 280. Since the vehicle control unit 200 performs the steering control and the acceleration and deceleration control according to Embodiment 1, the actuator controller 310 controls the EPS motor 5 so that the EPS motor 5 attains the target steering angle $\delta_{ref}$, and controls the powertrain unit 6 and the brake units 7 so that the powertrain unit 6 and the brake units 7 attain the target acceleration $\alpha_{ref}$. The collision avoidance system repeats the aforementioned operations.

Figure 5:
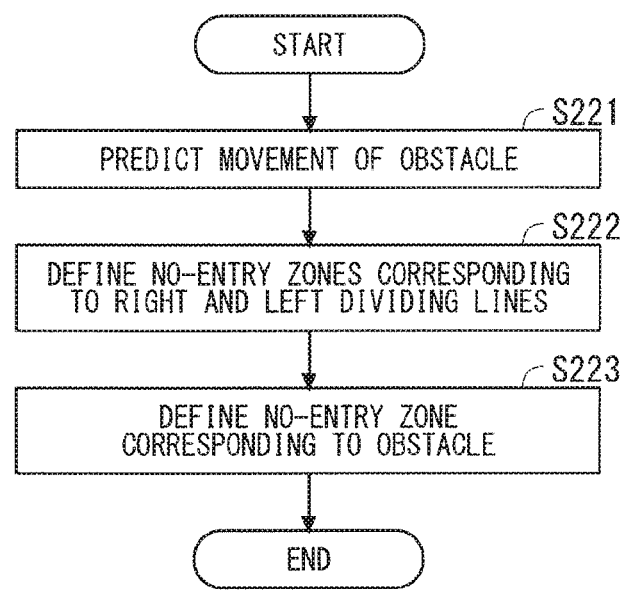
FIG. 5 is a flowchart for a process for defining a no-entry zone according to Embodiment 1 of the present invention.

Here, the process for defining a no-entry zone to be performed by the no-entry zone defining unit 220 in Step S220 of FIG. 4 will be described. FIG. 5 is a flowchart for the process for defining a no-entry zone.

In the process for defining a no-entry zone, first in Step S221, the no-entry zone defining unit 220 predicts movement of an obstacle based on Equations 119 and 120 described above.

Figure 6:
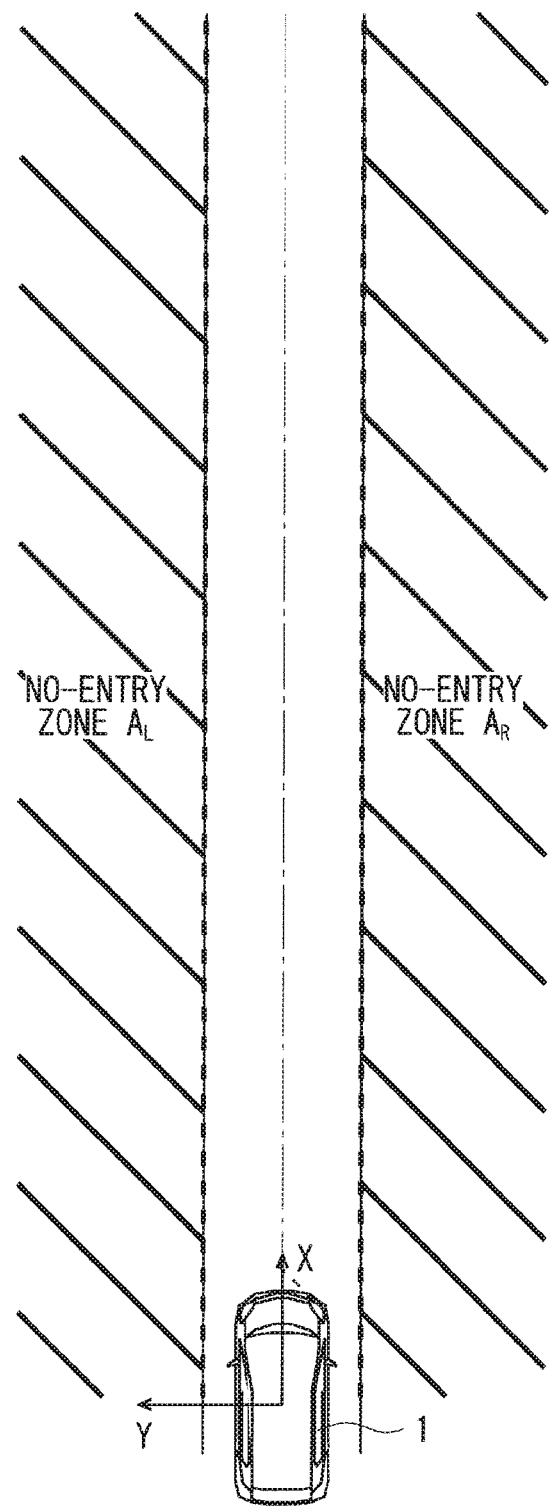
FIG. 6 illustrates example no-entry zones corresponding to right and left dividing liners.

Next in Step S222, the no-entry zone defining unit 220 defines no-entry zones corresponding to the right and left dividing lines of a traveling lane of the subject vehicle, based on the lane information obtained by the lane information obtaining unit 120 in Step S120 of FIG. 4. Specifically, as illustrated in FIG. 6, the no-entry zone defining unit 220 defines areas outside of the right and left dividing lines as no-entry zones $A_R$ and $A_L$, respectively. When the subject vehicle can pass through the areas outside of the dividing lines, the positions of the no-entry zones $A_R$ and $A_L$ may be appropriately changed so that an area where the subject vehicle can travel can be extended.

Next in Step S223, the no-entry zone defining unit 220 defines a no-entry zone corresponding to an obstacle, based on the obstacle information obtained by the obstacle information obtaining unit 110 in Step S110 of FIG. 4.

Figure 7:
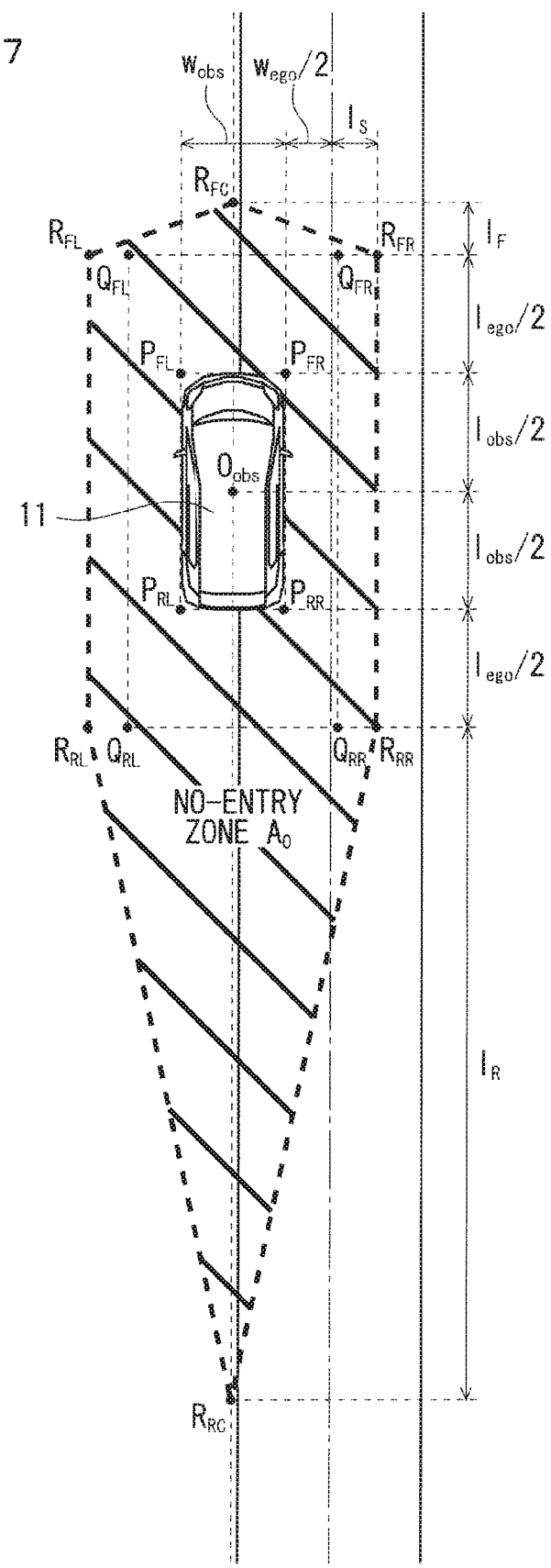
FIG. 7 illustrates a method for defining a no-entry zone corresponding to an obstacle.

FIG. 7 illustrates a method for defining a no-entry zone in Step S223 in FIG. 5. It is assumed herein that the subject vehicle (not illustrated) is traveling along a straight road and that the obstacle information obtaining unit 110 detects a vehicle 11 other than the subject vehicle (hereinafter referred to as a "non-subject vehicle") as an obstacle. It is also assumed that the non-subject vehicle 11 is stopped or is traveling parallel to the lane and ahead on the left of the subject vehicle. The lane may not be a straight road, and the obstacle may not be a vehicle. When the obstacle is ahead on the right of the subject vehicle, the processes to be described below may be performed on an image of the non-subject vehicle obtained by horizontally flipping the image in FIG. 7.

First as illustrated in FIG. 7, the no-entry zone defining unit 220 defines a rectangular area with apexes $P_{FL}$, $P_{FR}$, $P_{RR}$, and $P_{RL}$ an obstacle area (hereinafter referred to as an "obstacle area $P_{FL}P_{FR}P_{RR}P_{RL}$") based on the positions of the left front end $P_{FL}$, the right front end $P_{FR}$, the right rear end $P_{RR}$, and the left rear end $P_{RL}$ of the non-subject vehicle 11 that are obtained by the obstacle information obtaining unit 110.

Next, the no-entry zone defining unit 220 defines, as a collision area (hereinafter referred to as a "collision area $Q_{FL}Q_{FR}Q_{RR}Q_{RL}$"), a rectangular area with apexes $Q_{FL}$, $Q_{FR}$, $Q_{RR}$, and $Q_{RL}$ obtained by extending the obstacle area $P_{FL}P_{FR}P_{RR}P_{RL}$ both forward and backward (distant from and close to the subject vehicle) in a direction parallel to the lane by half the length $l_{ego}$ of the subject vehicle and also extending the obstacle area $P_{FL}P_{FR}P_{RR}P_{RL}$ both to the right and the left in a direction vertical to the lane by half the width $w_{ego}$ of the subject vehicle. The collision area $Q_{FL}Q_{FR}Q_{RR}Q_{RL}$ is an area where the subject vehicle may collide with the non-subject vehicle 11 when the subject vehicle is traveling parallel to the lane and the center of gravity of the subject vehicle enters the area.

Subsequently, the no-entry zone defining unit 220 finds a point $R_{RC}$ closer to the subject vehicle by a distance $l_R$ than the midpoint of the side $Q_{RL}Q_{RR}$ that is the closest side of the collision area $Q_{FL}Q_{FR}Q_{RR}Q_{RL}$, a point $R_{FC}$ more distant from the subject vehicle by a distance $l_F$ than the midpoint of the side $Q_{FL}Q_{FR}$ that is the most distant side of the collision area $Q_{FL}Q_{FR}Q_{RR}Q_{RL}$, and apexes $R_{FL}$, $R_{FR}$, $R_{RR}$, and $R_{RL}$ of a rectangular area obtained by extending the collision area $Q_{FL}Q_{FR}Q_{RR}Q_{RL}$ both to the right and the left in the direction vertical to the lane by a distance $l_S$. Then, the no-entry zone defining unit 220 defines a hexagonal area with apexes $R_{FL}$, $R_{FR}$, $R_{RR}$, $R_{RC}$, and $R_{RL}$ as a no-entry zone $A_o$. Here, $l_R$, $l_F$, and $l_S$ are parameters for defining a distance between the subject vehicle and an obstacle when making the subject vehicle avoid the obstacle (hereinafter referred to as an "avoidance distance").

Furthermore, the values $l_R$, $l_F$, and $l_S$ can be appropriately changed, and are set according to, for example, the speed limit of a traveling lane of the subject vehicle. For example, when the subject vehicle is traveling in a lane with a speed limit of 40 km/h, a general stopping distance (a sum of a brake reaction distance and a braking distance) while the subject vehicle is traveling at a speed of 40 km/h is approximately 20 m. Thus, $l_R$=20 [m] may be set. $l_R$, $l_F$, and $l_S$ may be time variants. For example, the avoidance distance is changed according to a difference in speed by changing $l_R$ and $l_S$ so that $l_R$ and $l_S$ increase as a difference in speed between the subject vehicle and an obstacle is more significant and so that $l_R$ and $l_S$ decrease as the difference in speed is less significant, which will improve the safety in avoiding a collision through steering.

The shape of the no-entry zone is not limited to the hexagon, but may be any. Forming the no-entry zone into a convex shape (here, a convex hexagon) can increase the speed of finding the optimal solution and the problem solving possibility. In the presence of a plurality of obstacles, no-entry zones corresponding to the respective obstacles may be similarly set.

Figure 8:
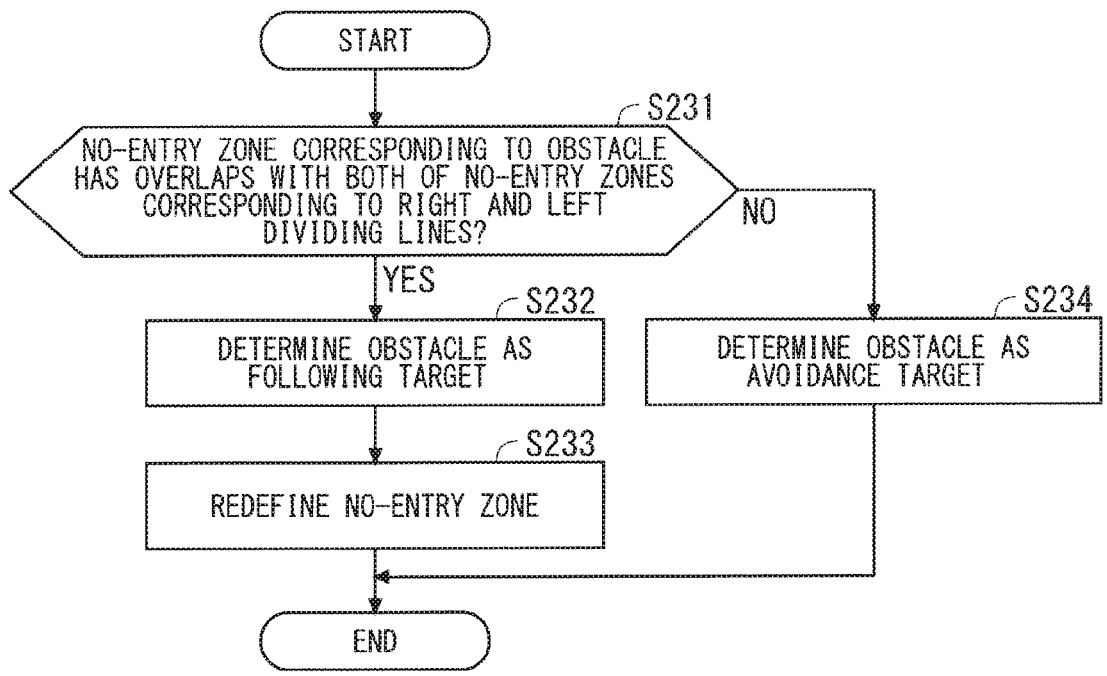
FIG. 8 is a flowchart for a process for making a following determination according to Embodiment 1 of the present invention.

Here, the process for making the following determination (determining whether an obstacle is an avoidance target or a following target) to be performed by the following determination unit 230 in Step S230 of FIG. 4 will be described. FIG. 8 is a flowchart for the process for making the following determination.

In Step S231, the following determination unit 230 determines whether the no-entry zone $A_o$ corresponding to an obstacle has overlaps with both of the no-entry zones $A_R$ and $A_L$ corresponding to the right and left dividing lines.

When the no-entry zone $A_o$ has the overlaps with both of the no-entry zones $A_R$ and $A_L$ (YES in Step S231), the following determination unit 230 determines the obstacle as a following target in Step S232 because there is no space for the subject vehicle to avoid the obstacle. In Step S233, the following determination unit 230 redefines a no-entry zone corresponding to the obstacle.

Figure 9:
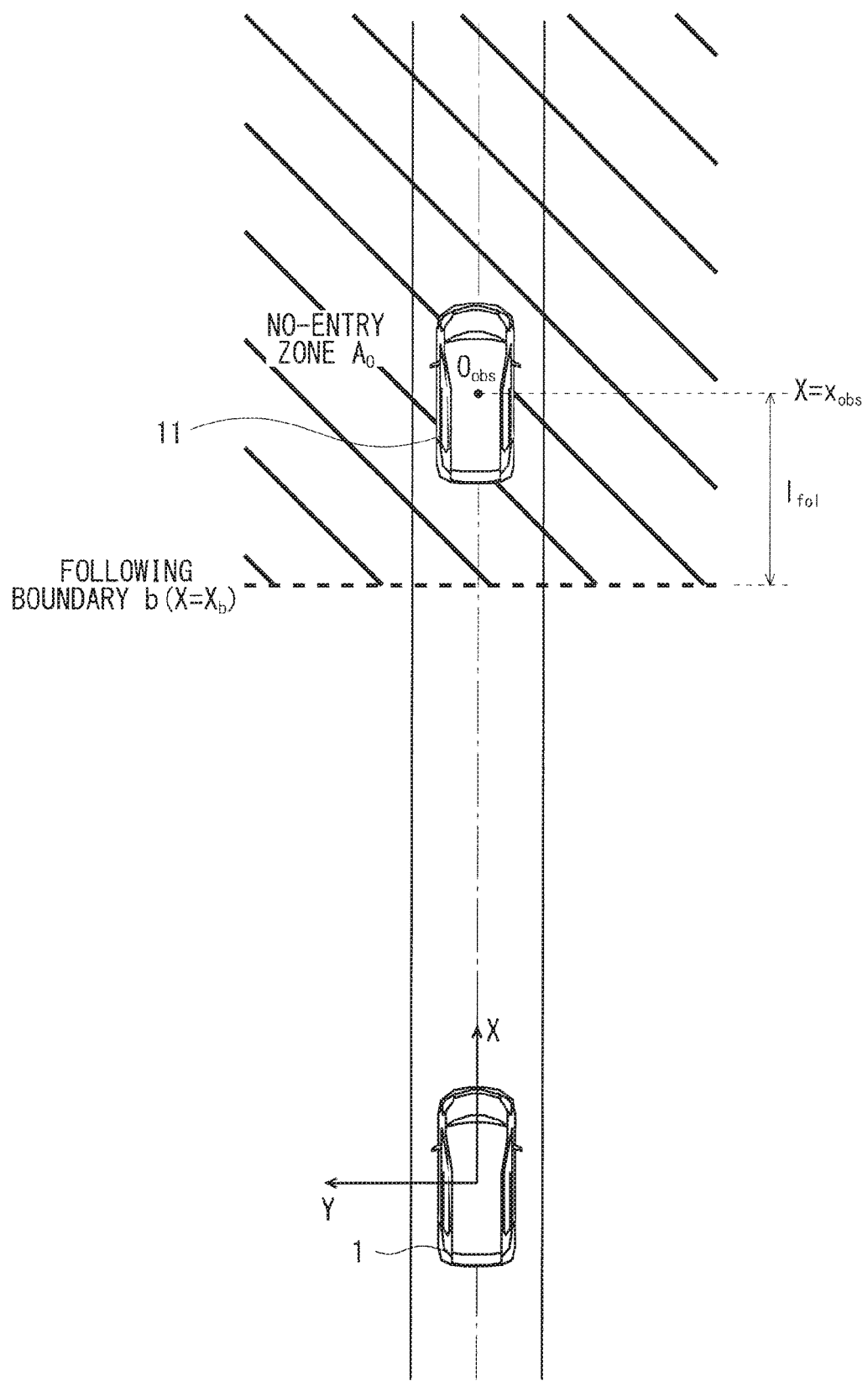
FIG. 9 illustrates a no-entry zone when an obstacle according to Embodiment 1 of the present invention is a following target.

FIG. 9 illustrates an example no-entry zone to be redefined for an obstacle (the non-subject vehicle 11) determined as a following target. When the non-subject vehicle 11 is determined as a following target, the subject vehicle 1 is made to follow the non-subject vehicle 11 so that a vehicle spacing between the subject vehicle 1 and the non-subject vehicle 11 is maintained at $l_{fol}$ or more. Thus, a following boundary b is set at a position $X_b$ that is closer to the subject vehicle 1 by $l_{fol}$ in a direction parallel to the lane than the position $x_{obs}$ in the X direction that is the center $O_{obs}$ of the non-subject vehicle 11 at each predicted point. Then, an area more distant from the subject vehicle 1 with respect to the following boundary b, that is, an area satisfying $X>X_b$ is redefined as a new no-entry zone $A_o$. Here, $l_{fol}$ is a time-variant or time-invariant parameter that can be appropriately changed in a range of $l_{fol}>(l_{ego}+l_{obs})/2$. For example, when the subject vehicle is traveling in a lane with a speed limit of 40 km/h, a general stopping distance while the subject vehicle is traveling at a speed of 40 km/h is approximately 20 m. Thus, $l_{fol}=(l_{ego}+l_{obs})/2+20$ [m] may be set. This holds when the non-subject vehicle 11 is stopped.

When the no-entry zone $A_o$ does not have the overlap with at least one of the no-entry zones $A_R$ and $A_L$ (NO in Step S231), the following determination unit 230 determines the obstacle as an avoidance target in Step S234 because there is a space for the subject vehicle to avoid the obstacle.

Although FIG. 8 illustrates an example following determination using a position relationship between the no-entry zone $A_o$ and the no-entry zones $A_R$ and $A_L$ as a criterion, the criterion for making the following determination is not limited to such, but for example, another criterion may be added under OR conditions.

For example, when the center of gravity of an obstacle is between the right and left dividing lines, the obstacle may be determined as a following target, irrespective of the position relationship between the no-entry zone $A_o$ and the no-entry zones $A_R$ and $A_L$. Consequently, an obstacle within a traveling lane of the subject vehicle is always determined as a following target. When the center of gravity of an obstacle is between the right and left dividing lines and the obstacle is moving, the obstacle may be determined as a following target, irrespective of the position relationship between the no-entry zone $A_o$ and the no-entry zones $A_R$ and $A_L$. Consequently, an obstacle traveling on a traveling lane of the subject vehicle can be determined as a following target. This can prevent the driver from attempting to overtake a vehicle in a lane in risky situations.

Figure 10:
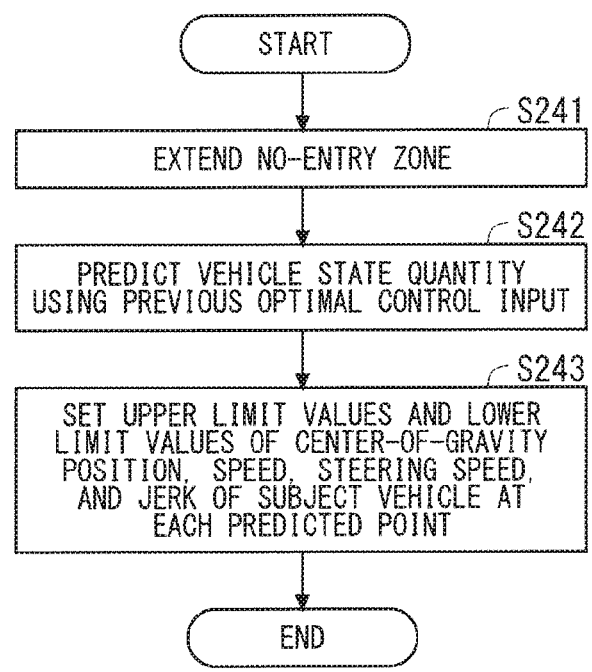
FIG. 10 is a flowchart for a process for establishing a constraint according to Embodiment 1 of the present invention.

Here, the constraint (Equation 114) to be generated by the constraint establishing unit 240 in Step S240 of FIG. 4 will be described. FIG. 10 is a flowchart for the process for generating a constraint.

In Step S241, the constraint establishing unit 240 calculates an OR (logical sum) of the no-entry zones $A_R$ and $A_L$ corresponding to the right and left dividing lines and the no-entry zone $A_o$ corresponding to an obstacle, to establish the final no-entry zones including all the no-entry zones $A_L$, $A_R$, and $A_o$. In other words, the final no-entry zone is equal to an area included in at least one of the no-entry zones $A_L$, $A_R$, and $A_o$.

Figure 11:
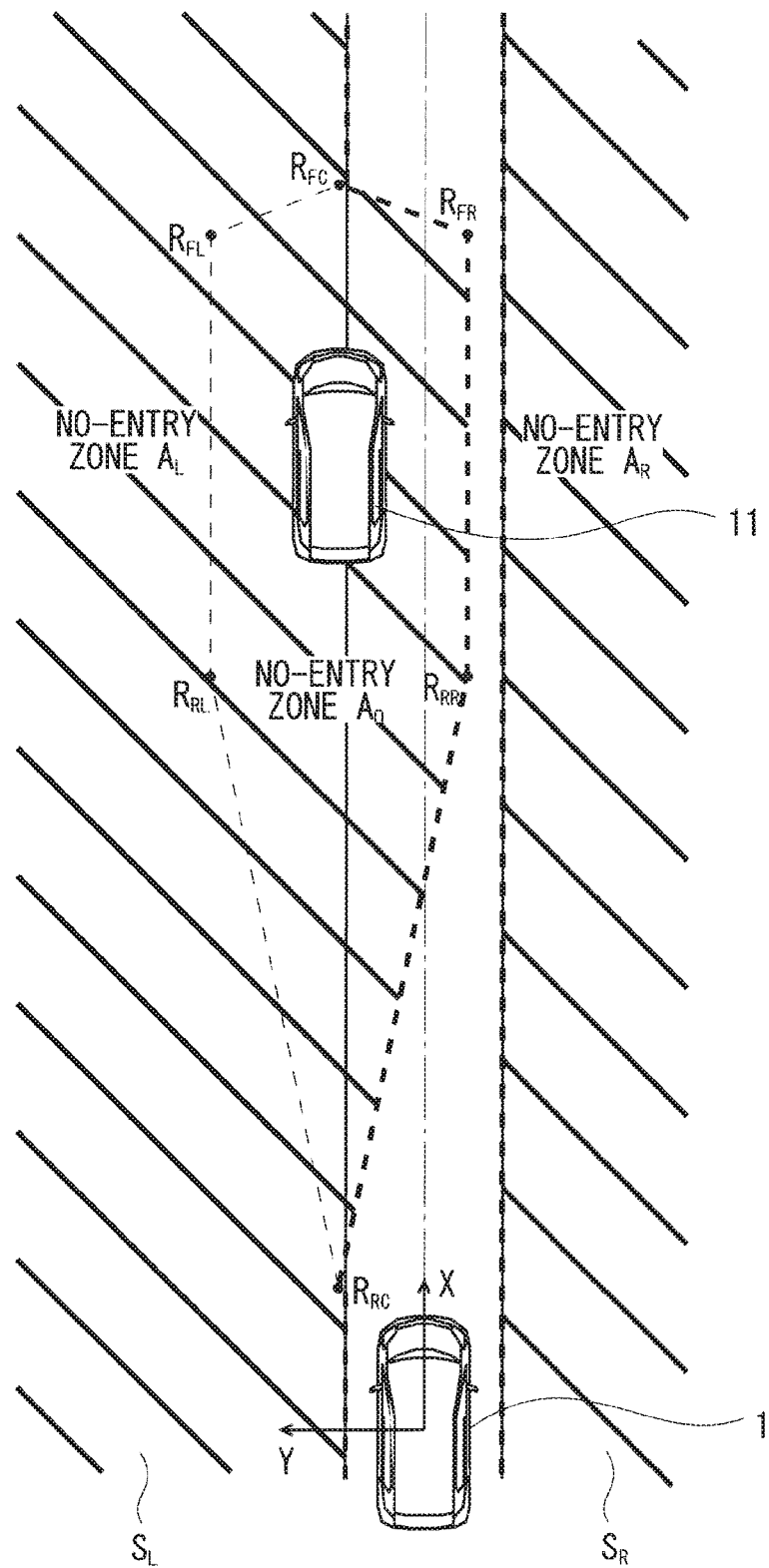
FIG. 11 illustrates example final no-entry zones.
Figure 12:
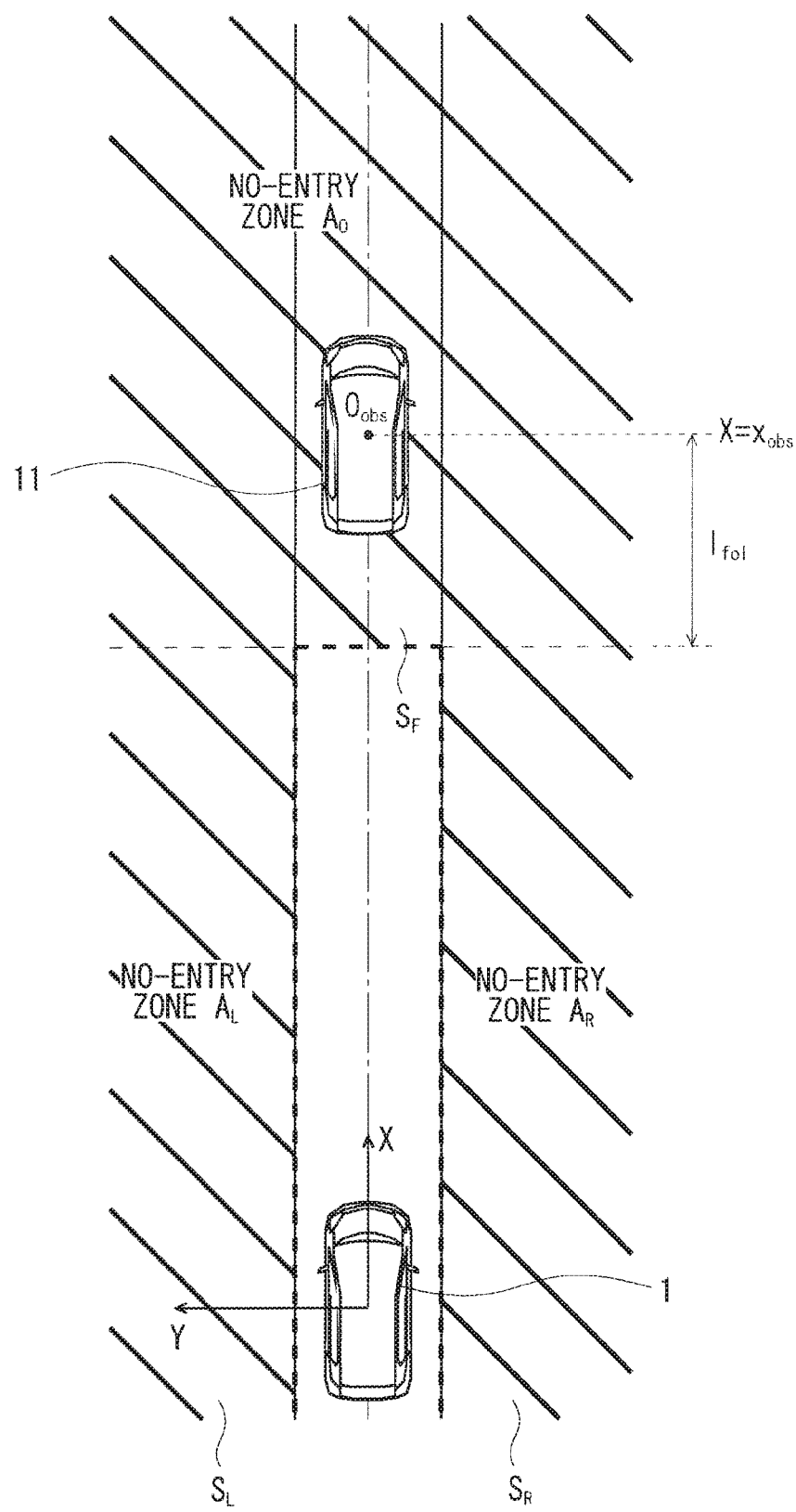
FIG. 12 illustrates example final no-entry zones.

For example, when the non-subject vehicle 11 that is an obstacle is determined as an avoidance target and the no-entry zone $A_o$ corresponding to the obstacle is defined as illustrated in FIG. 7, the final no-entry zones will be defined as illustrated in FIG. 11. Furthermore, when the non-subject vehicle 11 that is an obstacle is determined as a following target and the no-entry zone $A_o$ corresponding to the obstacle is defined as illustrated in FIG. 9, the final no-entry zones will be defined as illustrated in FIG. 12. The final no-entry zone that is defined to the left of the subject vehicle 1 will be referred to as a "no-entry zone $S_L$", the final no-entry zone that is defined to the right of the subject vehicle 1 will be referred to as a "no-entry zone $S_R$", and the final no-entry zone that is defined to obstruct the subject vehicle 1 in a forward direction will be referred to as a "no-entry zone $S_F$". When the obstacle (the non-subject vehicle 11) is an avoidance target, the no-entry zone $S_F$ does not exist.

Next in Step S242, the constraint establishing unit 240 predicts the optimal state quantity x* using the previous optimal control input u*. Here, the constraint establishing unit 240 computes the predicted optimal state quantity $\hat{X}_{k+1}{}^*$ (k=0, ..., N−1) using the next updated equation.

$$\hat{x}_{k+1}{}^* = \hat{x}_k{}^* + f(\hat{x}_k{}^*, \hat{u}_k{}^*) \quad \text{(Equation 125)}$$

Here, $\hat{x}_0{}^* = x_0$ holds. Furthermore, $\hat{u}_k{}^*$ (k=0, ..., N−1) is a predicted optimal control input found from the next Equation using the previous optimal control input $u_k{}^*$ (k=0, ..., N−1).

$$\hat{U}_0{}^* = u_1{}^*$$

$$\hat{U}_1{}^* = u_2{}^*$$

$$\hat{U}_{N-3}{}^* = u_{N-2}{}^*$$

$$\hat{U}_{N-2}{}^* = u_{N-1}{}^*$$

$$\hat{U}_{N-1}{}^* = u_{N-1}{}^* \quad \text{(Equation 126)}$$

Finally in Step S243, the constraint establishing unit 240 sets the upper limit value $^-X_C$ of the center-of-gravity position $X_C$ of the subject vehicle, the upper limit value $^-Y_c$ and the lower limit value $_-Y_c$ of the center-of-gravity position $Y_c$ of the subject vehicle, the upper limit value $^-V$ of the speed V, the upper limit value $^-\omega$ and the lower limit value $_-\omega$ of the steering speed $\omega$, and the upper limit value $^-j$ and the lower limit value $_-j$ of the jerk j. As a result, the constraint establishing unit 240 generates the constraint represented by Equation 114. When AutoGen or ACADO is applied, the upper and lower limit values can be set for each predicted point k (k=1, ..., N). Thus, the upper limit value $^-X_{c,k}$ of the center-of-gravity position $X_{c,k}$, the upper limit value $^-Y_{c,k}$ and the lower limit value $_-Y_{c,k}$ of the center-of-gravity position $Y_{c,k}$, and the upper limit value $^-V_k$ of the speed V are set for each predicted point k (k=1, ..., N) according to Embodiment 1.

Figure 13:
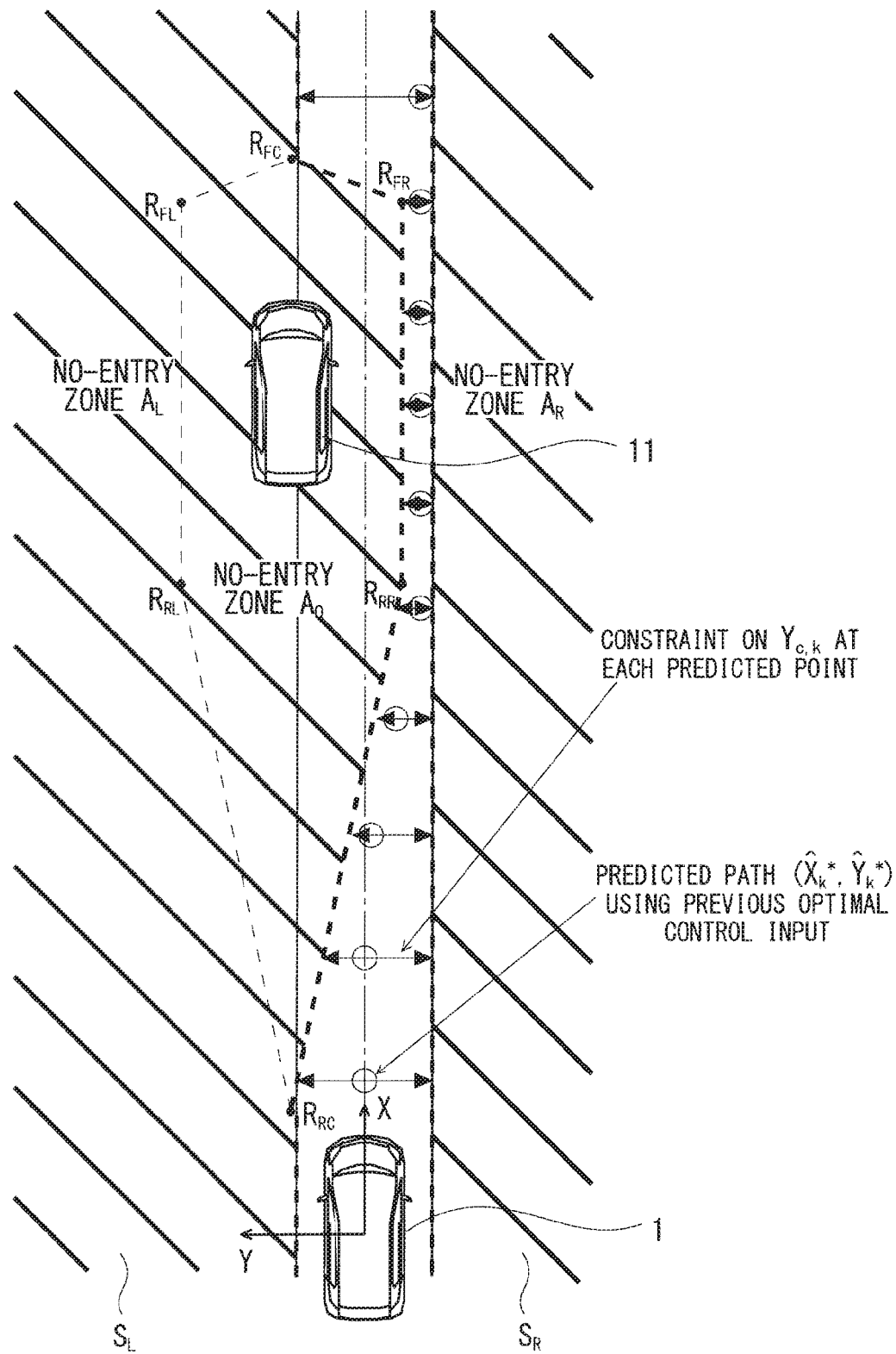
FIG. 13 illustrates the upper limit value and the lower limit value of the center-of-gravity position of a vehicle in a Y direction according to Embodiment 1 of the present invention.

Next, a method to be performed by the constraint establishing unit 240 in Step S243 of FIG. 10 for setting the upper limit value $^-Y_{c,k}$ and the lower limit value $_-Y_{c,k}$ of the center-of-gravity position $Y_{c,k}$ of the subject vehicle 1 at each predicted point will be described with reference to FIG. 13.

The constraint establishing unit 240 predicts a path of the subject vehicle 1 ($\hat{X}_k{}^*$, $\hat{Y}_k{}^*$)(k=1, ..., N), based on the predicted optimal state quantity $\hat{x}_k{}^*$(k=1, ..., N) computed in Step S242 of FIG. 10. As indicated by the arrows in FIG. 13, when the x coordinate is denoted by each $\hat{X}_k{}^*$, the minimum value of a y coordinate of the no-entry zone $S_L$ on the left is defined as the upper limit value $^-Y_{c,k}$, and the maximum value of a y coordinate of the no-entry zone $S_R$ on the right is defined as the lower value $_-Y_{c,k}$.

Similarly, the minimum value of an x coordinate of the no-entry zone $S_F$ ahead of the subject vehicle 1 is defined as the upper limit value $^-X_{c,k}$ of the center-of-gravity position $X_{c,k}$ of the subject vehicle 1. When the obstacle is an avoidance target, the no-entry zone $S_F$ does not exist. Thus, there is no need to establish a constraint on the center-of-gravity position $X_c$ of the subject vehicle 1.

Next, a method to be performed by the constraint establishing unit 240 in Step S243 of FIG. 10 for setting the upper limit value $^-V_k$ of the speed V will be described with reference to FIG. 14.

Figure 14:
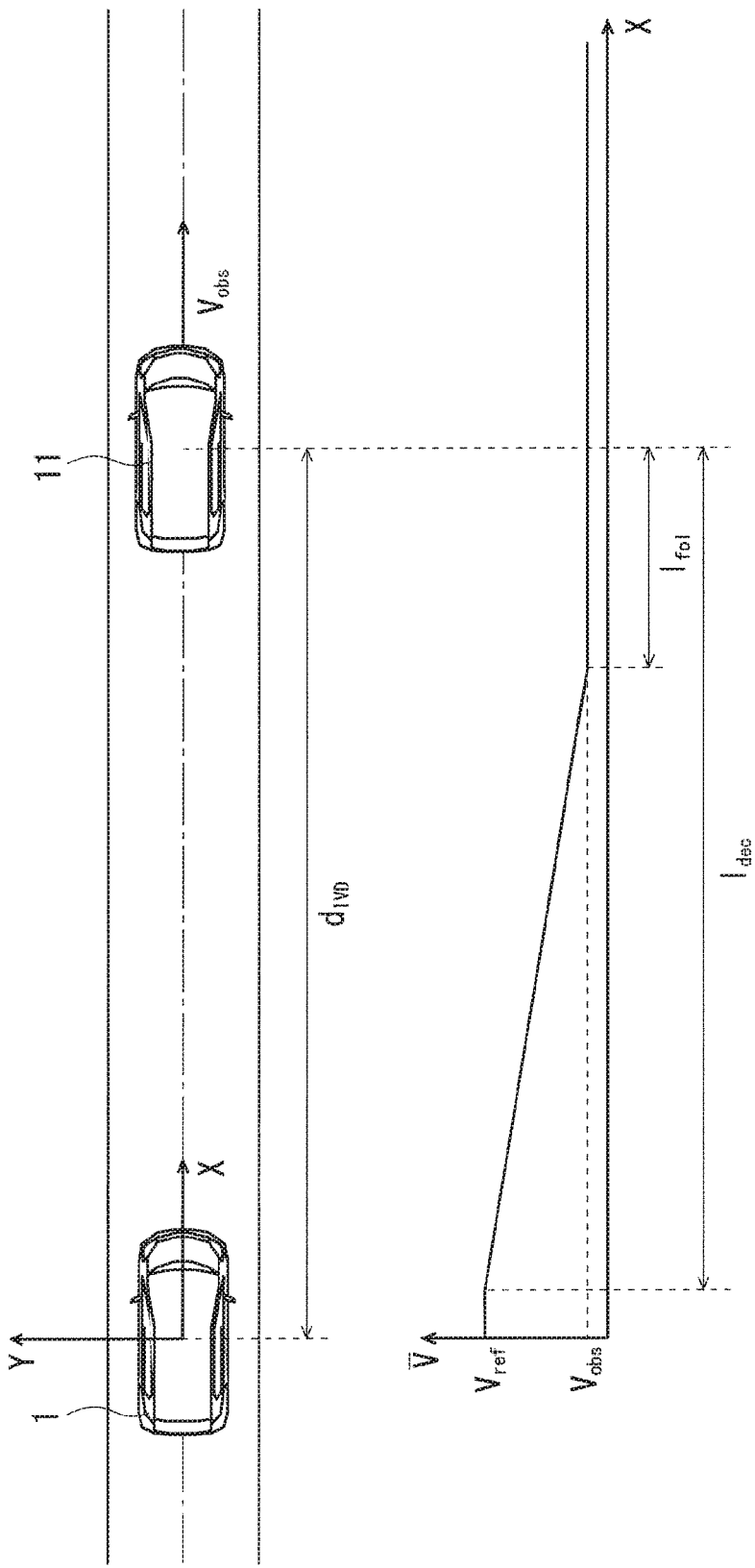
FIG. 14 illustrates the upper limit value of a speed when the obstacle according to Embodiment 1 of the present invention is a following target.

When the non-subject vehicle 11 that is a following target is ahead of the subject vehicle 1 as illustrated in FIG. 14, the constraint establishing unit 240 sets the upper limit value $^-V_k$ of the speed V according to a vehicle spacing $d_{IVD,k} = x_{obs,k} - X_{c,k}$ (k=1, ..., N) between the subject vehicle 1 and the non-subject vehicle 11 at each predicted point so that the subject vehicle 1 follows the non-subject vehicle 11 to maintain the vehicle spacing at $l_{fol}$ or more. The graph illustrated in FIG. 14 indicates an example relationship between the position of the subject vehicle 1 in the X direction and the upper limit value of the speed $^-V_k$.

When the vehicle spacing $d_{IVD,k}$ between the subject vehicle 1 and the non-subject vehicle 11 is sufficiently large, the subject vehicle 1 may travel at the target speed. Thus, the constraint establishing unit 240 uses, as a threshold, a distance $l_{dec}$ predefined as a sufficient vehicle spacing, and sets $^-V_k = V_{ref}$ if $d_{IVD,k} > l_{dec}$.

When the vehicle spacing between the subject vehicle 1 and the non-subject vehicle 11 is shortened and $d_{IVD,k} \leq l_{fol}$ holds, the subject vehicle 1 needs to travel at a speed lower than or equal to that of the non-subject vehicle 11 to maintain the vehicle spacing at $l_{fol}$ or more. Thus, the constraint establishing unit 240 refers to the speed $V_{obs,k}$ (k=1, ..., N) of the non-subject vehicle 11 at each predicted point. Then, the constraint establishing unit 240 sets $^-V_k = V_{obs,k}$ if $d_{IVD,k} = l_{fol}$, and makes the setting so that $^-V_k \leq V_{obs,k}$ is satisfied and $^-V_k$ becomes continuous and smooth if $d_{IVD,k} < l_{fol}$.

If $l_{fol} < d_{IVD}$ and $k \leq l_{dec}$, the constraint establishing unit 240 makes the setting so that $^-V_k$ continuously, smoothly, and monotonously decreases as $d_{IVD,k}$ decreases. Consequently, the control is possible so that the subject vehicle 1 starts to decelerate when the vehicle spacing $d_{IVD,k}$ smaller than or equal to the distance $l_{dec}$ and so that the speed of the subject vehicle 1 is equal to the speed of the non-subject vehicle 11 if the vehicle spacing $d_{IVD,k} = l_{fol}$.

Since the collision avoidance apparatus 201 according to Embodiment 1 can keep a lane and a speed and avoid a collision through steering and braking using the same controller, there is no need to switch between a controller for avoiding a collision through steering and a controller for avoiding a collision through braking, and the riding comfort of the subject vehicle in avoiding a collision will be improved. Moreover, changing a no-entry zone depending on whether an obstacle is an avoidance target or a following target and changing a constraint according to the no-entry zone allows the subject vehicle to avoid a collision through steering and braking with the minimal constraints. For example, when an obstacle is an avoidance target, the types of constraints can be reduced by not establishing constraints on the center-of-gravity position or a speed in a longitudinal direction of the subject vehicle. Consequently, advantages of reducing the computation load and increasing a probability of finding a solution are obtained.

Embodiment 2

In Embodiment 1, the following determination unit 230 determines whether an obstacle is an avoidance target or a following target (a following determination), depending on whether the no-entry zone $A_o$ corresponding to the obstacle has overlaps with both of the no-entry zones $A_R$ and $A_L$ corresponding to the right and left dividing lines. In Embodiment 2, hysteresis is applied to the following determination so that a result of the following determination does not cause hunting. The configuration and the basic operations of a collision avoidance system according to Embodiment 2 are identical to those according to Embodiment 1. Thus, the overlap with the description of Embodiment 1 will be omitted.

Figure 15:
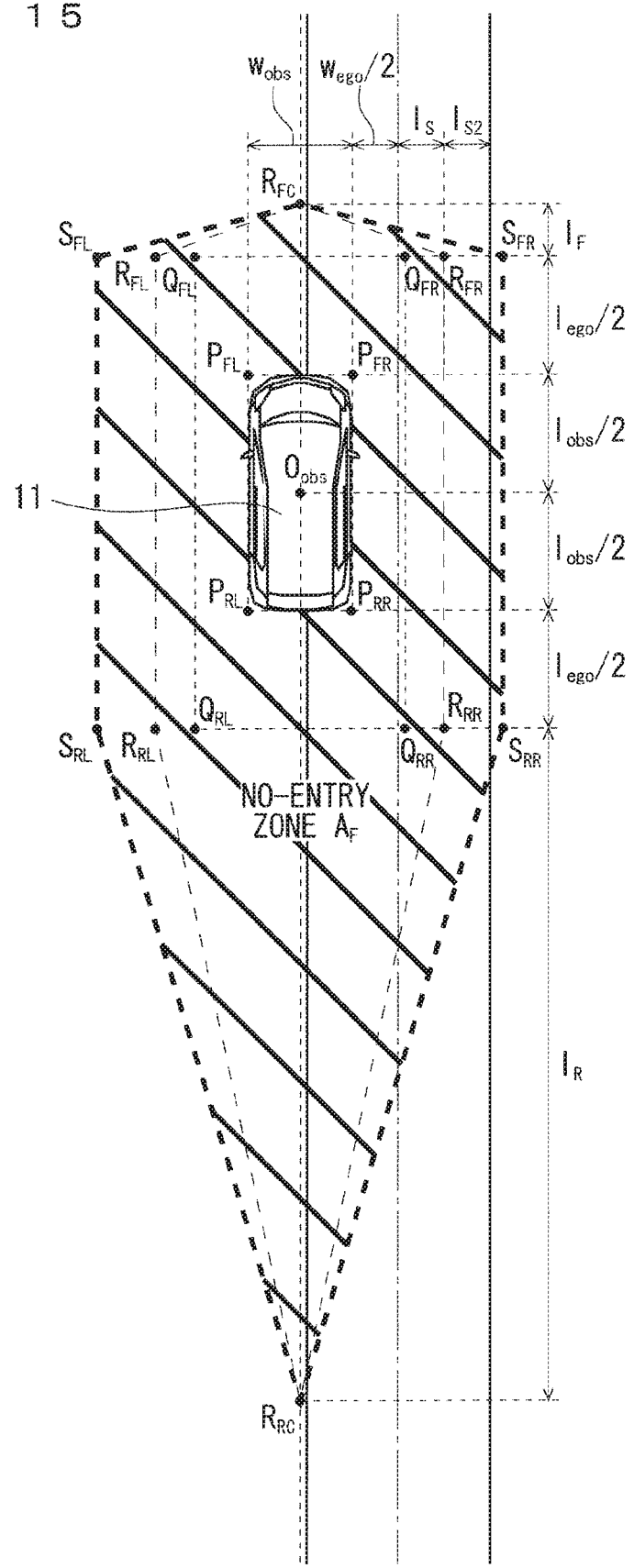
FIG. 15 illustrates a method for defining a following determination zone according to Embodiment 2 of the present invention.

To apply hysteresis to the following determination according to Embodiment 2, the no-entry zone defining unit 220 defines, for an obstacle, a zone for following determination (hereinafter referred to as a "following determination zone"). FIG. 15 illustrates a method for defining a following determination zone for an obstacle.

First, the no-entry zone defining unit 220 defines the no-entry zone $A_o$ corresponding to an obstacle (the non-subject vehicle 11) in the same method described with reference to FIG. 7 according to Embodiment 1. In other words, the no-entry zone $A_o$ is equal to a hexagonal area including the non-subject vehicle 11 and defined by the apex $R_{FL}$ located ahead on the left of the non-subject vehicle 11, the apex $R_{FC}$ located ahead of the non-subject vehicle 11, the apex $R_{FR}$ located ahead on the right of the non-subject vehicle 11, the apex $R_{RR}$ located right behind the non-subject vehicle 11, the apex $R_{RC}$ located behind the non-subject vehicle 11, and the apex $R_{RL}$ located left behind the non-subject vehicle 11.

Next, the no-entry zone defining unit 220 finds a hexagonal area with apexes $S_{FL}$, $R_{FC}$, $S_{FR}$, $S_{RR}$, $R_{RC}$, and $S_{RL}$ that is an area obtained by extending the no-entry zone $A_o$ both to the right and the left in the direction vertical to the lane by a distance $l_{S2}$, and defines the hexagonal area as a following determination zone $A_F$. Here, $l_{S2}$ is a time-variant or time-invariant parameter representing the size of the hysteresis.

The following determination zone $A_F$ is defined in Step S220 of the flowchart in FIG. 4. The method for defining the following determination zone $A_F$ is not limited to such, and the shape of the following determination zone $A_F$ may be any as long as the following determination zone $A_F$ includes the no-entry zone $A_o$.

In Step S230 of FIG. 4, the following determination unit 230 according to Embodiment 2 makes a following determination indicated in the flowchart of FIG. 16. The flowchart of FIG. 16 is obtained by adding Steps S235 to S239 below to the flowchart of FIG. 8. The processes for making the following determination to be performed by the following determination unit 230 according to Embodiment 2 will be described with reference to the flowchart of FIG. 16.

First in Step S235, the following determination unit 230 confirms whether an obstacle is determined as an avoidance target in a previous following determination. When determining the obstacle as an avoidance target in the previous following determination (YES in Step S235), the following determination unit 230 performs the processes of Steps S231 to S234 described with reference to FIG. 8.

When determining the obstacle as a following target in the previous following determination (NO in Step S235), the following determination unit 230 determines whether the following determination zone $A_F$ corresponding to the obstacle has overlaps with both of the no-entry zones $A_R$ and $A_L$ corresponding to the right and left dividing lines in Step S236.

When determining that the following determination zone $A_F$ has the overlaps with both of the no-entry zones $A_R$ and $A_L$ (YES in Step S236), the following determination unit 230 determines the obstacle as a following target in Step S237. In Step S238, the following determination unit 230 redefines the no-entry zone $A_o$ corresponding to the obstacle as illustrated in FIG. 9, similarly as Step S233.

When the following determination zone $A_F$ does not have the overlap with at least one of the no-entry zones $A_R$ and $A_L$ (No in Step S236), the following determination unit 230 determines the obstacle as an avoidance target in Step S239.

The obstacle is reset as an avoidance target when first detected. In other words, if the following determination on the obstacle is initially made, that is, if there is no result of the previous following determination on the obstacle, YES is determined in Step S235.

The no-entry zone defining unit 220 defines the following determination zone $A_F$ including the no-entry zone $A_o$ corresponding to the obstacle, and makes a following determination with reference to the following determination zone $A_F$ when determining the Obstacle as an avoidance target in the previous following determination. Consequently, the collision avoidance apparatus 201 according to Embodiment 2 can apply hysteresis to the following determination. This prevents the occurrence of hunting from the result of the following determination, and the riding comfort of the subject vehicle will be improved. Even when an obstacle that is a following target is distant from a dividing line and the subject vehicle can avoid (overtake) the obstacle, the obstacle is not determined as an avoidance target soon but is determined as an avoidance target after the obstacle is sufficiently distant from the dividing line. Thus, the subject vehicle will safely avoid the obstacle.

Embodiments according to the present invention can be freely combined or appropriately modified and omitted within the scope of the invention.

What is claimed is:

1. A collision avoidance apparatus, comprising:
    a processor to execute a program; and
    a memory to store the program which, when executed by the processor, performs processes of:
    defining a no-entry zone for preventing a subject vehicle from colliding with an obstacle around the subject vehicle, based on obstacle information including information on a position of the obstacle and based on lane information that is information on a traveling lane of the subject vehicle;
    making a following determination on whether the obstacle is an avoidance target or a following target, based on the position of the obstacle or a position of the no-entry zone;
    establishing a constraint on a state quantity or a control input of the subject vehicle to prevent the subject vehicle from at least entering the no-entry zone;
    setting an evaluation function for evaluating at least a route following error and a speed following error as evaluation items so that a degree of evaluation increases as the route following error is smaller and the speed following error is smaller, the route following error being an error in a predicted route with respect to a target route of the subject vehicle, the speed following error being an error in a predicted speed with respect to a target speed of the subject vehicle;

computing, under the constraint, a solution for increasing the degree of evaluation on the evaluation function;

computing a predicted value of the state quantity of the subject vehicle based on the solution; and computing a target value of each of an actuator that controls an amount of steering of the subject vehicle and an actuator that controls an amount of acceleration or deceleration of the subject vehicle, based on at least one of the solution and the predicted value of the state quantity.

2. The collision avoidance apparatus according to claim 1, wherein the processor further defines no-entry zones corresponding to right and left dividing lines of the traveling lane of the subject vehicle, and the processor determines the obstacle as the following target when determining that the no-entry zone corresponding to the obstacle has overlaps with both of the no-entry zones corresponding to the right and left dividing lines, and determines the obstacle as the avoidance target when the no-entry zone corresponding to the obstacle does not have the overlap with at least one of the no-entry zones corresponding to the right and left dividing lines.

3. The collision avoidance apparatus according to claim 1, wherein the following determination has hysteresis.

4. The collision avoidance apparatus according to claim 3, wherein the processor further defines no-entry zones corresponding to right and left dividing lines of the traveling lane of the subject vehicle, and a following determination zone including the no-entry zone corresponding to the obstacle, in the case where the processor determines the obstacle as the avoidance target in a previous following determination, the processor determines the obstacle as the following target when determining that the no-entry zone corresponding to the obstacle has overlaps with both of the no-entry zones corresponding to the right and left dividing lines, and determines the obstacle as the avoidance target when the no-entry zone corresponding to the obstacle does not have the overlap with at least one of the no-entry zones corresponding to the right and left dividing lines, and in the case where the processor determines the obstacle as the following target in the previous following determination, the processor determines the obstacle as the following target when determining that the following determination zone has overlaps with both of the no-entry zones corresponding to the right and left dividing lines, and determines the obstacle as the avoidance target when the following determination zone does not have the overlap with at least one of the no-entry zones corresponding to the right and left dividing lines.

5. The collision avoidance apparatus according to claim 1, wherein the processor determines the obstacle as the following target when at least a center of gravity of the obstacle is in the traveling lane of the subject vehicle, in making the following determination.

6. The collision avoidance apparatus according to claim 1, wherein the processor determines the obstacle as the following target when at least a center of gravity of the obstacle is in the traveling lane of the subject vehicle and the obstacle is moving, in making the following determination.

7. The collision avoidance apparatus according to claim 1, wherein the processor changes the constraint depending on whether the obstacle is determined as the avoidance target or the following target.

8. The collision avoidance apparatus according to claim 7, wherein the processor establishes a constraint on a lateral position of the subject vehicle to prevent the subject vehicle from entering the no-entry zone, when determining the obstacle as the avoidance target.

9. The collision avoidance apparatus according to claim 7, wherein the processor establishes a constraint on a longitudinal position of the subject vehicle to prevent the subject vehicle from entering the no-entry zone, when determining the obstacle as the following target.

10. The collision avoidance apparatus according to claim 7, wherein in the case where a non-subject vehicle determined as the following target is in the traveling lane of the subject vehicle as the obstacle, the processor establishes a constraint on an upper speed limit of the subject vehicle according to a vehicle spacing between the subject vehicle and the non-subject vehicle, reduces the upper speed limit as the vehicle spacing is shorter, and sets the upper speed limit lower than or equal to a speed of the non-subject vehicle when the vehicle spacing is less than or equal to a predefined value.

11. The collision avoidance apparatus according to claim 7, wherein the processor establishes a constraint on a command value for the actuator that controls the amount of steering of the subject vehicle, and eases the constraint on the command value for the actuator that controls the amount of steering of the subject vehicle when determining the obstacle as the avoidance target.

12. The collision avoidance apparatus according to claim 7, wherein the processor establishes a constraint on a command value for the actuator that controls the amount of acceleration or deceleration of the subject vehicle, and eases the constraint on the command value for the actuator that controls the amount of acceleration or deceleration of the subject vehicle when determining the obstacle as the following target.

13. The collision avoidance apparatus according to claim 1, wherein the processor changes the evaluation function, depending on whether the obstacle is determined as the avoidance target or the following target.

14. The collision avoidance apparatus according to claim 13, wherein the processor reduces a weight assigned to the route following error in the evaluation on the evaluation function when determining the obstacle as the avoidance target.

15. The collision avoidance apparatus according to claim 13, wherein the processor reduces a weight assigned to the speed following error in the evaluation on the evaluation function when determining the obstacle as the following target.

* * * * *